United States Patent
Futa

(10) Patent No.: US 7,092,522 B1
(45) Date of Patent: Aug. 15, 2006

(54) APPARATUS FOR SOLVING SYSTEM OF EQUATIONS ON FINITE FIELD AND APPARATUS FOR INVERTING ELEMENT OF EXTENSION FIELD

(75) Inventor: Yuichi Futa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 969 days.

(21) Appl. No.: 09/603,636

(22) Filed: Jun. 26, 2000

(30) Foreign Application Priority Data

Jul. 16, 1999 (JP) ............................... 11-203055
May 12, 2000 (JP) ............................. 2000-140886

(51) Int. Cl.
*H04K 1/00* (2006.01)
*H04L 9/00* (2006.01)
(52) U.S. Cl. ................................ 380/28; 380/30
(58) Field of Classification Search .............. 380/28, 380/30
See application file for complete search history.

(56) References Cited

U.S. PATENT DOCUMENTS 4,322,577 A * 3/1982 Brandstrom ................. 380/37
5,375,170 A * 12/1994 Shamir ......................... 380/30

OTHER PUBLICATIONS

Curtis, Charles W.; Linear Algebra an introductory approach; 1984; Springer-Verlag New York, Inc.; pp. 16-108.*
Hill, Lester S.; Concerning Certain Linear Transformation apparatus of cryptography; 1931; pp. 135-154.*
Hill, Lester S.; Cryptography in an Algebraic Alphabet; 1929; pp. 306-312.*
"Fast Elliptic Curve Algorithm Combining Frobenius Map and Table Reference to Adapt to Higher Characteristic," by T. Kobayashi et al., EUROCRYPT'99, LNCS 1592, pp. 176-189, 1999.
Fenn, S.T.J. et al., "GF (2M) Multiplication and Division Over the Dual Basis", IEEE Transactions on Computers, IEEE, Inc., New York, US, vol. 45, No. 3, Mar. 1, 1996, pp. 319-327.
Hochet, B. et al., "Systolic Gaussian Elimination Over GF (P) With Partial Pivoting", IEEE Transactions on Computers, IEEE, Inc., New York, US, vol. 38, No. 9, Sep. 1, 1989, pp. 1321-1324.
M. Anwarul Hasan et al., "Bit-Serial Systolic Divider and Multiplier for Finite Fields GF(2M)", IEEE Transactions on Computers, IEEE, Inc., New York, US vol. 41, No. 8, Aug. 1, 1992, pp. 972-980.

* cited by examiner

*Primary Examiner*—Gilberto Barrón, Jr.
*Assistant Examiner*—Jung Kim

(57) ABSTRACT

An equation transforming unit triangular transforms a matrix M and a vector v to generate a matrix M' and a vector v' for a system of linear equations M'x=v' in n unknowns that has an equivalence relation with a system of linear equations Mx=v in n unknowns. The triangular transformation is such that the matrix M is transformed into an upper triangular matrix without the diagonal elements of the matrix M being changed to 1. An inverting unit calculates the inverses of the diagonal elements of the matrix M'. An equation computing unit finds the solutions of the system of linear equations M'x=v' using the matrix M', the vector v', and the calculated inverses of the diagonal elements. An inverse computing unit computes the inverse I of an element y in GF(q) which is an extension field of a finite field GF(p), based on the solutions found by the equation computing unit.

26 Claims, 11 Drawing Sheets

FIG. 6

(a) $\begin{pmatrix} 17 & 10 & 27 & 12 & 7 \\ 19 & 17 & 10 & 27 & 12 \\ 6 & 19 & 17 & 10 & 27 \\ 29 & 6 & 19 & 17 & 10 \\ 5 & 29 & 6 & 19 & 17 \end{pmatrix}^{401} \times \begin{pmatrix} X_0 \\ X_1 \\ X_2 \\ X_3 \\ X_4 \end{pmatrix} = \begin{pmatrix} 1 \\ 0 \\ 0 \\ 0 \\ 0 \end{pmatrix}^{402}$ (b) $\begin{pmatrix} 17 & 10 & 27 & 12 & 7 \\ \boxed{0} & 6 & 29 & 14 & 9 \\ 6 & 19 & 17 & 10 & 27 \\ 29 & 6 & 19 & 17 & 10 \\ 5 & 29 & 6 & 19 & 17 \end{pmatrix}^{411} \times \begin{pmatrix} X_0 \\ X_1 \\ X_2 \\ X_3 \\ X_4 \end{pmatrix} = \begin{pmatrix} 1 \\ \boxed{12} \\ 0 \\ 0 \\ 0 \end{pmatrix}^{412}$ (c) $\begin{pmatrix} 17 & 10 & 27 & 12 & 7 \\ 0 & 6 & 29 & 14 & 9 \\ \boxed{0} & 15 & 3 & 5 & 14 \\ \boxed{0} & 29 & 5 & 3 & 29 \\ \boxed{0} & 9 & 29 & 15 & 6 \end{pmatrix}^{421} \times \begin{pmatrix} X_0 \\ X_1 \\ X_2 \\ X_3 \\ X_4 \end{pmatrix} = \begin{pmatrix} 1 \\ 12 \\ \boxed{25} \\ \boxed{2} \\ \boxed{26} \end{pmatrix}^{422}$ (d) $\begin{pmatrix} 17 & 10 & 27 & 12 & 7 \\ 0 & 6 & 29 & 14 & 9 \\ 0 & \boxed{0} & 17 & 6 & 11 \\ 0 & \boxed{0} & 26 & 15 & 6 \\ 0 & \boxed{0} & 6 & 26 & 17 \end{pmatrix}^{431} \times \begin{pmatrix} X_0 \\ X_1 \\ X_2 \\ X_3 \\ X_4 \end{pmatrix} = \begin{pmatrix} 1 \\ 12 \\ \boxed{1} \\ \boxed{5} \\ \boxed{17} \end{pmatrix}^{432}$ (e) $\begin{pmatrix} 17 & 10 & 27 & 12 & 7 \\ 0 & 6 & 29 & 14 & 9 \\ 0 & 0 & 17 & 6 & 11 \\ 0 & 0 & \boxed{0} & 6 & 2 \\ 0 & 0 & \boxed{0} & 3 & 6 \end{pmatrix}^{441} \times \begin{pmatrix} X_0 \\ X_1 \\ X_2 \\ X_3 \\ X_4 \end{pmatrix} = \begin{pmatrix} 1 \\ 12 \\ 1 \\ \boxed{28} \\ \boxed{4} \end{pmatrix}^{442}$ (f) $\begin{pmatrix} 17 & 10 & 27 & 12 & 7 \\ 0 & 6 & 29 & 14 & 9 \\ 0 & 0 & 17 & 6 & 11 \\ 0 & 0 & 0 & 6 & 2 \\ 0 & 0 & 0 & \boxed{0} & 30 \end{pmatrix}^{451} \times \begin{pmatrix} X_0 \\ X_1 \\ X_2 \\ X_3 \\ X_4 \end{pmatrix} = \begin{pmatrix} 1 \\ 12 \\ 1 \\ 28 \\ \boxed{2} \end{pmatrix}^{452}$

FIG. 8

(a) $\begin{pmatrix} 17 & 10 & 27 & 12 & 7 \\ 19 & 17 & 10 & 27 & 12 \\ 6 & 19 & 17 & 10 & 27 \\ 29 & 6 & 19 & 17 & 10 \\ 5 & 29 & 6 & 19 & 17 \end{pmatrix}_{501} \times \begin{pmatrix} X_0 \\ X_1 \\ X_2 \\ X_3 \\ X_4 \end{pmatrix} = \begin{pmatrix} 1 \\ 0 \\ 0 \\ 0 \\ 0 \end{pmatrix}_{502}$ (b) $\begin{pmatrix} 17 & 10 & 27 & 12 & 7 \\ \boxed{0} & \boxed{12} & \boxed{27} & \boxed{28} & \boxed{18} \\ 6 & 19 & 17 & 10 & 27 \\ 29 & 6 & 19 & 17 & 10 \\ 5 & 29 & 6 & 19 & 17 \end{pmatrix}_{511} \times \begin{pmatrix} X_0 \\ X_1 \\ X_2 \\ X_3 \\ X_4 \end{pmatrix} = \begin{pmatrix} 1 \\ \boxed{24} \\ 0 \\ 0 \\ 0 \end{pmatrix}_{512}$ (c) $\begin{pmatrix} 17 & 10 & 27 & 12 & 7 \\ 0 & 12 & 27 & 28 & 18 \\ \boxed{0} & 2 & 19 & 11 & 6 \\ \boxed{0} & 7 & 29 & 5 & 7 \\ \boxed{0} & 25 & 22 & 21 & 27 \end{pmatrix}_{521} \times \begin{pmatrix} X_0 \\ X_1 \\ X_2 \\ X_3 \\ X_4 \end{pmatrix} = \begin{pmatrix} 1 \\ 24 \\ \boxed{24} \\ \boxed{24} \\ \boxed{24} \end{pmatrix}_{522}$ (d) $\begin{pmatrix} 17 & 10 & 27 & 12 & 7 \\ 0 & 12 & 27 & 28 & 18 \\ 0 & \boxed{0} & 8 & 1 & 7 \\ 0 & \boxed{0} & 14 & 20 & 8 \\ 0 & \boxed{0} & 12 & 21 & 3 \end{pmatrix}_{531} \times \begin{pmatrix} X_0 \\ X_1 \\ X_2 \\ X_3 \\ X_4 \end{pmatrix} = \begin{pmatrix} 1 \\ 24 \\ \boxed{26} \\ \boxed{17} \\ \boxed{3} \end{pmatrix}_{532}$ (e) $\begin{pmatrix} 17 & 10 & 27 & 12 & 7 \\ 0 & 12 & 27 & 28 & 18 \\ 0 & 0 & 8 & 1 & 7 \\ 0 & 0 & \boxed{0} & 16 & 26 \\ 0 & 0 & \boxed{0} & 14 & 28 \end{pmatrix}_{541} \times \begin{pmatrix} X_0 \\ X_1 \\ X_2 \\ X_3 \\ X_4 \end{pmatrix} = \begin{pmatrix} 1 \\ 24 \\ 26 \\ \boxed{23} \\ \boxed{29} \end{pmatrix}_{542}$ (f) $\begin{pmatrix} 17 & 10 & 27 & 12 & 7 \\ 0 & 12 & 27 & 28 & 18 \\ 0 & 0 & 8 & 1 & 7 \\ 0 & 0 & 0 & 16 & 26 \\ 0 & 0 & 0 & \boxed{0} & 22 \end{pmatrix}_{551} \times \begin{pmatrix} X_0 \\ X_1 \\ X_2 \\ X_3 \\ X_4 \end{pmatrix} = \begin{pmatrix} 1 \\ 24 \\ 26 \\ 23 \\ \boxed{18} \end{pmatrix}_{552}$

FIG. 11

(a) $\begin{pmatrix} 17 & 10 & 27 & 12 & 7 \\ 19 & 17 & 10 & 27 & 12 \\ 6 & 19 & 17 & 10 & 27 \\ 29 & 6 & 19 & 17 & 10 \\ 5 & 29 & 6 & 19 & 17 \end{pmatrix} \times \begin{pmatrix} X_0 \\ X_1 \\ X_2 \\ X_3 \\ X_4 \end{pmatrix} = \begin{pmatrix} 1 \\ 0 \\ 0 \\ 0 \\ 0 \end{pmatrix}$ (b) $\begin{pmatrix} \boxed{1} & 17 & 18 & 8 & 15 \\ 19 & 17 & 10 & 27 & 12 \\ 6 & 19 & 17 & 10 & 27 \\ 29 & 6 & 19 & 17 & 10 \\ 5 & 29 & 6 & 19 & 17 \end{pmatrix} \times \begin{pmatrix} X_0 \\ X_1 \\ X_2 \\ X_3 \\ X_4 \end{pmatrix} = \begin{pmatrix} \boxed{11} \\ 0 \\ 0 \\ 0 \\ 0 \end{pmatrix}$ (c) $\begin{pmatrix} 1 & 17 & 18 & 8 & 15 \\ \boxed{0} & 4 & 9 & 30 & 6 \\ \boxed{0} & 10 & 2 & 24 & 30 \\ \boxed{0} & 9 & 24 & 2 & 9 \\ \boxed{0} & 6 & 9 & 10 & 4 \end{pmatrix} \times \begin{pmatrix} X_0 \\ X_1 \\ X_2 \\ X_3 \\ X_4 \end{pmatrix} = \begin{pmatrix} 11 \\ \boxed{8} \\ \boxed{27} \\ \boxed{22} \\ \boxed{7} \end{pmatrix}$ (d) $\begin{pmatrix} 1 & 17 & 18 & 8 & 15 \\ 0 & \boxed{1} & 10 & 23 & 17 \\ 0 & 10 & 2 & 24 & 30 \\ 0 & 9 & 24 & 2 & 9 \\ 0 & 6 & 9 & 10 & 4 \end{pmatrix} \times \begin{pmatrix} X_0 \\ X_1 \\ X_2 \\ X_3 \\ X_4 \end{pmatrix} = \begin{pmatrix} 11 \\ \boxed{2} \\ 27 \\ 22 \\ 7 \end{pmatrix}$ (e) $\begin{pmatrix} 1 & 17 & 18 & 8 & 15 \\ 0 & 1 & 10 & 23 & 17 \\ 0 & \boxed{0} & 26 & 11 & 15 \\ 0 & \boxed{0} & 27 & 12 & 11 \\ 0 & \boxed{0} & 11 & 27 & 26 \end{pmatrix} \times \begin{pmatrix} X_0 \\ X_1 \\ X_2 \\ X_3 \\ X_4 \end{pmatrix} = \begin{pmatrix} 11 \\ 2 \\ \boxed{7} \\ \boxed{4} \\ \boxed{26} \end{pmatrix}$ (f) $\begin{pmatrix} 1 & 17 & 18 & 8 & 15 \\ 0 & 1 & 10 & 23 & 17 \\ 0 & 0 & \boxed{1} & 4 & 28 \\ 0 & 0 & 27 & 12 & 11 \\ 0 & 0 & 11 & 27 & 26 \end{pmatrix} \times \begin{pmatrix} X_0 \\ X_1 \\ X_2 \\ X_3 \\ X_4 \end{pmatrix} = \begin{pmatrix} 11 \\ 2 \\ \boxed{11} \\ 4 \\ 26 \end{pmatrix}$ (g) $\begin{pmatrix} 1 & 17 & 18 & 8 & 15 \\ 0 & 1 & 10 & 23 & 17 \\ 0 & 0 & 1 & 4 & 28 \\ 0 & 0 & \boxed{0} & 28 & 30 \\ 0 & 0 & \boxed{0} & 14 & 28 \end{pmatrix} \times \begin{pmatrix} X_0 \\ X_1 \\ X_2 \\ X_3 \\ X_4 \end{pmatrix} = \begin{pmatrix} 11 \\ 2 \\ 11 \\ \boxed{17} \\ \boxed{29} \end{pmatrix}$ (h) $\begin{pmatrix} 1 & 17 & 18 & 8 & 15 \\ 0 & 1 & 10 & 23 & 17 \\ 0 & 0 & 1 & 4 & 28 \\ 0 & 0 & 0 & \boxed{1} & 21 \\ 0 & 0 & 0 & 14 & 28 \end{pmatrix} \times \begin{pmatrix} X_0 \\ X_1 \\ X_2 \\ X_3 \\ X_4 \end{pmatrix} = \begin{pmatrix} 11 \\ 2 \\ 11 \\ \boxed{15} \\ 29 \end{pmatrix}$ (i) $\begin{pmatrix} 1 & 17 & 18 & 8 & 15 \\ 0 & 1 & 10 & 23 & 17 \\ 0 & 0 & 1 & 4 & 28 \\ 0 & 0 & 0 & 1 & 21 \\ 0 & 0 & 0 & \boxed{0} & 13 \end{pmatrix} \times \begin{pmatrix} X_0 \\ X_1 \\ X_2 \\ X_3 \\ X_4 \end{pmatrix} = \begin{pmatrix} 11 \\ 2 \\ 11 \\ 15 \\ \boxed{5} \end{pmatrix}$ (j) $\begin{pmatrix} 1 & 17 & 18 & 8 & 15 \\ 0 & 1 & 10 & 23 & 17 \\ 0 & 0 & 1 & 4 & 28 \\ 0 & 0 & 0 & 1 & 21 \\ 0 & 0 & 0 & 0 & \boxed{1} \end{pmatrix} \times \begin{pmatrix} X_0 \\ X_1 \\ X_2 \\ X_3 \\ X_4 \end{pmatrix} = \begin{pmatrix} 11 \\ 2 \\ 11 \\ 15 \\ \boxed{29} \end{pmatrix}$

APPARATUS FOR SOLVING SYSTEM OF EQUATIONS ON FINITE FIELD AND APPARATUS FOR INVERTING ELEMENT OF EXTENSION FIELD

This application is based on applications Nos. 11-203055 and 2000-140886 filed in Japan, the contents of which are hereby incorporated by reference.

BACKGROUND OF THE INVENTION

1. Field of the Invention

The present invention relates to cryptographic and error correction techniques for information security, and in particular relates to computation techniques which use extension fields and systems of equations.

2. Description of the Prior Art

Secret communication or digital signature techniques have increasingly been used in data communication in recent years.

Secret communication techniques allow communication to be performed without the communicated content being revealed to third parties. Digital signature techniques, meanwhile, enable the recipient to verify whether the communicated content is valid or whether the information is from the stated sender. Such secret communication or digital signature techniques use a cryptosystem called public key cryptography. Public key cryptography provides a convenient method for managing the separate encryption keys of many users, and so has become a fundamental technique for performing communication with a large number of users.

In the public key cryptography, different keys are used for encryption and decryption, with the decryption key being kept secret and the encryption key being made public. Here, one of the founding principles for the security of public key cryptography is the so-called discrete logarithm problem. Representative examples of the discrete logarithm problem are problems based on finite fields and problems based on elliptic curves. Such problems are described in detail in Neal Koblitz (1987), *A Course in Number Theory and Cryptography*, Springer-Verlag.

(Elliptic Curve Discrete Logarithm Problem)

The elliptic curve discrete logarithm problem is the following.

Let E be an elliptic curve defined over a finite field GF(q) ($q=p^n$, p a prime, n a positive integer), with a point G on the elliptic curve E, given when the order of E is divisible by a large prime, being set as a base point. This being so, the problem is to find an integer x such that $$Y=x*G$$

where Y is a given point on E, if such an integer x exists.

In this specification, the operator * represents elliptic curve exponentiation, so that x*G means G is added to itself x times on E. Also, GF(q) is an extension field of a finite field GF(p). For details about extension fields, see T. Okamoto & H. Yamamoto (1997), *Modern Encryption, Mathematics of Information Sciences Series*, Sangyo Tosho, pp. 26–28.

(Prior Art 1: ElGamal Signature Scheme which Uses the Elliptic Curve Discrete Logarithm Problem)

The ElGamal signature scheme using the elliptic curve discrete logarithm problem is described below with reference to FIG. 9.

In the figure, a device 310 used by a user A (hereafter, "user A 310"), a management center 320, and a device 330 used by a user B (hereafter, "user B 330") are connected via a network.

Let p be a prime, $q=p^n$, n be a positive integer, and E be an elliptic curve over a finite field GF(q), with G being a base point of E and r being the order of G. Which is to say, r is the smallest positive integer that satisfies $$r*G=0$$

where 0 is the zero element in the additive group on the elliptic curve E.

(1) Public Key Generation by the Management Center 320

First, the management center 320 generates a public key $Y_A$ of the user A 310 using the user A's secret key $x_A$ which has been informed beforehand, according to the equation $$Y_A=x_A*G$$

(S1, S2).

The management center 320 announces the finite field GF(q), the elliptic curve E, and the base point G as system parameters, and reveals the public key $Y_A$ of the user A 310 to the user B 330 (S3, S4).

(2) Signature Generation by the User A 310

The user A 310 generates a random number k (S5), calculates $$R_1=(r_x,r_y)=k*G$$

(S6), and finds s satisfying $$s \times k = m + r_x \times x_A \bmod r$$

(S7) where m is a message to be sent from the user A 310 to the user B 330.

The user A 310 sends the message m and the signature ($R_1$,s) to the user B 330 (S8).

(3) Signature Verification by the User B 330

The user B 330 verifies the authenticity of the user A 310 by judging whether $$s*R_1=m*G+r_x*Y_A$$

is true (S9).

This equation is derived from $$\begin{aligned}
s*R_1 &= [((m+r_x \times x_A)/k) \times k]*G \\
&= (m+r_x \times x_A)*G \\
&= m*G + (r_x \times x_A)*G \\
&= m*G + r_x*Y_A
\end{aligned}$$

In this ElGamal digital signature scheme using the elliptic curve discrete logarithm problem, elliptic curve exponentiation is repeatedly performed to generate the public key and the signature and to verify the signature.

For details on elliptic curve exponentiation, see "Efficient Elliptic Curve Exponentiation" in Miyaji, Ono & Cohen (1997), *Advances in Cryptology-Proceedings of ICICS'97*, Lecture Notes in Computer Science, Springer-Verlag, pp. 282–290 (hereafter "document 1").

Let an elliptic curve be defined by an equation of the form $$y^2=x^3+a \times x+b$$

with some point P on the elliptic curve being represented by 2-tuple coordinates ($x_1,y_1$) called affine coordinates.

Elliptic curve exponentiation in the 2-tuple coordinate is known to involve inverse operations on the finite field GF(q).

Document 1 makes brief mention of a 3-tuple coordinate called projective coordinate. 2-tuple coordinates can be transformed into corresponding 3-tuple coordinates as shown by $$(x_1, y_1) \rightarrow (x_1, y_1, 1)$$

Elliptic curve exponentiation in the 3-tuple coordinate involves no inverse operations on the finite field GF(q). Since inverting a finite field element generally takes considerable computation time, the 3-tuple coordinate is often used in elliptic curve exponentiation.

However, when transforming 3-tuple coordinates into corresponding 2-tuple coordinates as shown by $$(X, Y, Z) \rightarrow (X/Z, Y/Z)$$

inversion on the finite field GF(q) is necessary.

In step S6 in FIG. 9, for instance, after 2-tuple coordinates are transformed into 3-tuple coordinates, elliptic curve exponentiation is performed on the 3-tuple coordinates, and the resulting 3-tuple coordinates are transformed into corresponding 2-tuple coordinates. Inversion is needed in this transformation of the 3-tuple coordinates to the 2-tuple coordinates.

(Prior Art 2: Inversion in an Extension Field)

A conventional inverse operation on an extension field GF(q) ($q=p^n$, p a prime, n a positive integer) is performed in the following way.

For simplicity's sake, a generator polynomial of the extension field GF(q) is set as $f(g)=g^n-\beta$ whose root is $\alpha$, and an element of GF(q) to be inputted in the generator polynomial is set as $$x = x_0 + x_1 \times \alpha + \ldots + x_{n-1} \times \alpha^{n-1}$$

(1) Step 1

Based on the element x of GF(q), a system of equations for $y_i$ (i=0, 1, ..., n−1)

$$x_0 y_0 + \beta x_{n-1} y_1 + \beta x_{n-2} y_2 + \ldots + \beta x_1 y_{n-1} = 1$$
$$x_1 y_0 + x_0 y_1 + \beta x_{n-1} y_2 + \ldots + \beta x_2 y_{n-1} = 0$$
$$x_2 y_0 + x_1 y_1 + x_0 y_2 + \ldots + \beta x_3 y_{n-1} = 0$$
$$\vdots$$
$$x_{n-2} y_0 + x_{n-3} y_1 + x_{n-4} y_2 + \ldots + \beta x_{n-1} y_{n-1} = 0$$
$$x_{n-1} y_0 + x_{n-2} y_1 + x_{n-3} y_2 + \ldots + x_0 y_{n-1} = 0$$

is formed.

(2) Step 2

The solutions $y_k$ (k=0,1, ..., n−1) of the system of equations are sought.

(3) Step 3

From the solutions $y_k$ (k=0,1, ..., n−1), the inverse $$I = y_0 + y_1 \alpha + \ldots y_{n-1} \alpha^{n-1}$$

is calculated. Hence the inverse of the element x in the extension field GF(q) is obtained.

The validity of this inverse operation is shown below. If the inverse I and the element x satisfy the relationship $$xI = 1 \bmod f(g)$$

then $$xI = x_0(y_0 + y_1 \alpha + \ldots + y_{n-1} \alpha^{n-1}) +$$
$$x_1 \alpha (y_0 + y_1 \alpha + \ldots + y_{n-1} \alpha^{n-1}) +$$
$$x_2 \alpha^2 (y_0 + y_1 \alpha + \ldots + y_{n-1} \alpha^{n-1}) +$$
$$\vdots$$
$$x_{n-1} \alpha^{n-1} (y_0 + y_1 \alpha + \ldots + y_{n-1} \alpha^{n-1})$$

and also $$\alpha^n \beta \bmod f(g)$$

Accordingly, $$xI = x_0(y_0 + y_1 \alpha + \ldots + y_{n-1} \alpha^{n-1}) +$$
$$x_1(y_0 \alpha + y_1 \alpha^2 + \ldots + y_{n-1} \beta) +$$
$$x_2(y_0 \alpha^2 + y_1 \alpha^3 + \ldots + y_{n-1} \alpha \beta) +$$
$$\vdots$$
$$x_{n-1}(y_0 \alpha^{n-1} + y_1 \beta + \ldots + y_{n-1} \alpha^{n-2} \beta)$$

which can be rearranged in ascending order of power of $\alpha$ into $$xI = x_0 y_0 + \beta \times x_{n-1} \times y_1 + \ldots + \beta x_1 y_{n-1} +$$
$$\alpha(x_1 y_0 + x_0 \times y_1 + \ldots + \beta x_2 y_{n-1}) +$$
$$\alpha^2 (x_2 y_0 + x_1 y_1 + \ldots + \beta x_3 y_{n-1}) +$$
$$\vdots$$
$$\alpha^{n-1}(x_{n-1} y_0 + x_{n-2} y_1 + \ldots + x_0 y_{n-1})$$

From this equation and the relationship xI=1, the system of equations in step 1 is derived.

Therefore, calculating an inverse in the extension field GF(q) is equivalent to solving a system of equations on the basic field GF(p).

Though the foregoing example uses the generator polynomial of the form $g^n - \beta$ for simplicity's sake, a system of equations can be formed by the same procedure for a generator polynomial of ordinary form.

(Prior Art 3: Solution of a System of Equations on the Basic Field GF(p))

A conventional method for solving a system of equations on the basic field GF(p) is described below. This method is called Gaussian elimination. For details on Gaussian elimination, see K. Mizugam$_i$ (1985), *Mathematical Calculations by Computers, Introduction to Programming Series*, Asakura Shoten, pp. 76~82 (hereafter "document 2").

A system of equations for $x_k$ (k=0, 1, 2, ..., n−1)

$$a_{11} x_0 + a_{12} x_1 + \ldots + a_{1n} x_{n-1} = b_1$$
$$a_{21} x_0 + a_{22} x_1 + \ldots + a_{2n} x_{n-1} = b_2$$
$$\vdots$$
$$a_{n1} x_0 + a_{n2} x_1 + \ldots + a_{nn} x_{n-1} = b_n$$

is solved by Gaussian elimination in the following manner.

(Step 1)

A matrix M and a vector v are given respectively as $$M = \begin{pmatrix} a_{11} & a_{12} & \ldots & a_{1n} \\ a_{21} & a_{22} & \ldots & a_{2n} \\ \vdots & \vdots & \vdots & \vdots \\ a_{n1} & a_{n2} & \ldots & a_{nn} \end{pmatrix}$$

$$v = \begin{pmatrix} b_1 \\ b_2 \\ \vdots \\ b_n \end{pmatrix}$$

Meanwhile, a vector X is given as $$X = \begin{pmatrix} x_0 \\ x_1 \\ \bullet \\ \bullet \\ x_{n-1} \end{pmatrix}$$

Then the above system of equations can be simply written as $$MX = v$$

The matrix M and the vector v are triangular transformed so as to put the matrix M into upper triangular form, as a result of which a matrix M' and a vector v' are generated. Here, the triangular transformation is such a transformation that changes all elements beneath the diagonal elements of a matrix to 0, and such a transformed matrix is called an upper triangular matrix.

The procedure of this conventional triangular transformation is explained below with reference to FIG. 10.

First, counter j is set at 1 (S21). Next, the inverse $I_j$ of $a_{jj}$ is computed (S22), 1 is assigned to $a_{jj}$ (S23), and $a_{jk}=a_{jk} \times I_j$ and $b_j=b_j \times I_j$ are set for $j+1 \leq k \leq n$ (S24). Then counter i is set at j+1 (S25).

Following this, 0 is assigned to $a_{ij}$ (S26), $a_{ik}=a_{ik}-a_{ij} \times a_{jk}$ is set for $j+1 \leq k \leq n$ (S27), and also $b_i=b_i-a_{ij} \times b_j$ is set (S28). Then it is judged whether i=n (S29). If i≠n, counter i is incremented by 1 (S31) and the procedure returns to step S26. If i=n, it is judged whether j=n (S30). If j≠n, counter j is incremented by 1 and the procedure returns to step S22. If j=n, the procedure ends.

As a result, the matrix M' and the vector v' are obtained. The matrix M' is a matrix whose diagonal elements are all 1 and whose elements beneath the diagonal elements are all 0.

The system of equations M'X=v' and the system of equations MX=v have an equivalence relation.

Let the matrix M' and the vector v' be written respectively as $$M' = \begin{pmatrix} c_{11} & c_{12} & \ldots & c_{1n} \\ c_{21} & c_{22} & \ldots & c_{2n} \\ \bullet & \bullet & \bullet & \bullet \\ \bullet & \bullet & \bullet & \bullet \\ c_{n1} & c_{n2} & \ldots & c_{nn} \end{pmatrix}$$

$$v' = \begin{pmatrix} d_1 \\ d_2 \\ \bullet \\ \bullet \\ d_n \end{pmatrix}$$

(Step 2)

The system of equations M'X=v' is solved using the generated matrix M' and vector v', in the following way.

The values n−1, . . . , 1, 0 are set one by one in counter c in this order. For counter c, $$y_c = d_{c+1}$$

is calculated when c=n−1, and $$y_c = d_{c+1} - \sum_{i=c+1}^{n-1} (c_{c+1\ i+1} \times y_{i-1})$$

is calculated when c≠n−1.

CONCRETE EXAMPLE

A concrete example of applying the prior art 3 is presented below.

Note that this example is provided here only for facilitating the understanding of the triangular transformation, and is not an example of practical use in cryptographic communication or digital signature systems.

When a prime p=31, a generator polynomial $f(g)=g^5-2$, and an element $x=5\alpha^4+29\alpha^3+6\alpha^2+19\alpha+17$ of GF(q) are given, the calculations $$x \times \alpha = 5\alpha^5 + 29\alpha^4 + 6\alpha^3 + 19\alpha^2 + 17\alpha$$
$$= 29\alpha^4 + 6\alpha^3 + 19\alpha^2 + 17\alpha + 5 \times 2$$

$$x \times \alpha^2 = 29\alpha^5 + 6\alpha^4 + 19\alpha^3 + 17\alpha^2 + 10\alpha$$
$$= 6\alpha^4 + 19\alpha^3 + 17\alpha^2 + 10\alpha + 29 \times 2$$

$$x \times \alpha^3 = 6\alpha^5 + 19\alpha^4 + 17\alpha^3 + 10\alpha^2 + 27\alpha$$
$$= 19\alpha^4 + 17\alpha^3 + 10\alpha^2 + 27\alpha + 6 \times 2$$

$$x \times \alpha^4 = 19\alpha^5 + 17\alpha^4 + 10\alpha^3 + 27\alpha^2 + 12\alpha$$
$$= 17\alpha^4 + 10\alpha^3 + 27\alpha^2 + 12\alpha + 19 \times 2$$

lead to a system of equations shown in FIG. 11(a), where a coefficient matrix 301 consists of 5 rows and 5 columns and a constant vector 302 consists of 5 elements.

In the system of equations in FIG. 11(a), a linear equation $$17x_0 + 10x_1 + 27x_2 + 12x_3 + 7x_4 = 1$$

is called a pivotal equation that serves as the pivot of transformation, and the other linear equations are called object equations that are to be transformed.

First, the inverse operation $$1/17 \bmod 31 = 11$$

is performed, and then $$10 \times 11 \bmod 31 = 17$$

$$27 \times 11 \bmod 31 = 18$$

$$12 \times 11 \bmod 31 = 8$$

$$7 \times 11 \bmod 31 = 15$$

$$1 \times 11 \bmod 31 = 11$$

are calculated. As a result, the system of equations is transformed as shown in FIG. 11(b), where the element in the first column and row has become 1 in a coefficient matrix 311. The elements enclosed with the boxes in the coefficient matrix 311 and constant vector 312 in FIG. 11(b) are those which have changed from the coefficient matrix 301 and constant vector 302 in FIG. 11(a). The same goes for the rest of FIG. 11.

Here, the above inverse operation 1/17 mod 31=11 is carried out by first seeking a which satisfies $$a \times 17 + b \times 31 = 1$$

by means of the extended GCD (Greatest Common Divisor), and then setting a as the inversion result.

In general, the extended GCD takes considerable computational complexity, as it involves repeated multiplications and additions. For details on the extended GCD, see H. Cohen (1996) "A Course in Computational Algebraic Number Theory" in *Graduate Texts in Mathematics* 138, Springer-Verlag, pp. 16~19.

Next, $$17 - 17 \times 19 = 4 \bmod 31$$

$$10 - 18 \times 19 = 9 \bmod 31$$

$$27 - 8 \times 19 = 30 \bmod 31$$

$$12 - 15 \times 19 = 6 \bmod 31$$

$$0 - 11 \times 19 = 8 \bmod 31$$

are calculated to convert the element in the first column and second row in the coefficient matrix 311 to 0, and in a like manner the elements in the first column and third to fifth rows in the coefficient matrix 311 are converted to 0, thereby transforming the coefficient matrix 311 in FIG. 11(b) into a coefficient matrix 321 shown in FIG. 11(c). The constant vector 312 is also transformed into a constant vector 322, as a result of which a system of equations shown in FIG. 11(c) is obtained.

Next, the coefficient matrix 321 is transformed into a coefficient matrix 331 so that the element in the second column and row becomes 1, and the constant vector 322 is transformed into a constant vector 332. Hence a system of equations shown in FIG. 11(d) is obtained. Further, the coefficient matrix 331 is transformed into a coefficient matrix 341 so that the elements in the second column and third to fifth rows become 0, and the constant vector 332 is transformed into a constant vector 342. Hence a system of equations shown in FIG. 11(e) is obtained.

Likewise, the element in the third column and row is converted to 1 in a coefficient matrix 351 in FIG. 11(f), and the elements in the third column and fourth to fifth rows are converted to 0 in a coefficient matrix 361 in FIG. 11(g). After this, the element in the fourth column and row is converted to 1 in a coefficient matrix 371 in FIG. 11(h), and the element in the fourth column and fifth row is converted to 0 in a coefficient matrix 381 in FIG. 11(i). Lastly, the element in the fifth column and row is converted to 1 in a coefficient matrix 391 in FIG. 11(j).

Thus, the coefficient matrix 301 is transformed into the upper triangular matrix 391.

Following this, $$y_4 = 29$$

$$y_3 = 15 - 21 \times 29$$
$$= 26 \bmod 31$$

$$y_2 = 11 - 4 \times 26 - 28 \times 29$$
$$= 25 \bmod 31$$

$$y_1 = 2 - 10 \times 25 - 23 \times 26 - 17 \times 29$$
$$= 25 \bmod 31$$

$$y_0 = 11 - 17 \times 25 - 18 \times 25 - 8 \times 26 - 15 \times 29$$
$$= 12 \bmod 31$$

are computed.

(Computational Complexity)

The total computational complexity of the prior art 3 is evaluated below. Here, computational complexity of one multiplication on a basic field is measured as 1Mul and computational complexity of one inversion on the basic field is measured as 1Inv.

In step 1 in the prior art 3, computational complexity for one value of counter j can be broken down as follows.

(a) Step S22 involves one inversion, so that computational complexity is 1Inv.

(b) Step S24 involves $((n-(j+1)+1)+1)=(n-j+1)$ multiplications, so that computational complexity is $(n-j+1)$ Mul.

(c) For one value of counter i, step S27 involves $(n-(j+1)+1)$ multiplications and so computational complexity is $(n-j)$Mul (c1), and step S28 involves one multiplication and so computational complexity is 1Mul (c2). Since counter i changes from j+1 to n, (c1) and (c2) are repeated $(n-(j+1)+1)=(n-j)$ times, which makes the computational complexity of for all values of counter c at $((n-j)(n-j+1))$Mul.

Summing (a), (b), and (c) together results in computational complexity of $((n-j+1)(n-j+1))$Mul+1Inv.

Since counter j changes from 1 to n, the total computational complexity of step 1 is $$\sum_{j=1}^{n} (((n-j+1)(n-j+1))Mul + 1Inv)$$

$$= \sum_{j=1}^{n} ((n-j+1)(n-j+1))Mul + \sum_{j=1}^{n} 1Inv$$

-continued $$= \sum_{j=1}^{n} j^2 Mul + nInv$$

$$= (1/6 \times n(n+1)(2n+1))Mul + n\, Inv$$

On the other hand, computational complexity of step 2 in the prior art 3 is as follows.

For one value of counter c, (n−(c+1)+1)=(n−c) multiplications are necessary, so that computational complexity is (n−c)Mul.

Since counter c changes from 1 to n, the total computational complexity of step 2 is $$\sum_{c=1}^{n}(n-c)Mul = \sum_{c=1}^{n}(c-1)Mul$$

$$= \left(\sum_{c=1}^{n} c - \sum_{c=1}^{n} 1\right)Mul$$

$$= (1/2 \times n(n+1) - n)Mul$$

$$= (1/2 \times n(n-1))Mul$$

Therefore, the overall computational complexity of the prior art 3 is (1/6×n(n+1)(2n+1)+1/2×n(n−1))Mul+nInv=1/3×n× (n²+3n−1)Mul+nInv It is known that in a general-purpose computer 1Inv=40Mul when n=5 and |q|=160 (|q| is the bit size of q). Accordingly, the overall computational complexity of the prior art 3 is 265Mul.

As described above, an inverse of an element in an extension field can be computed by solving a system of equations on a finite field. Nevertheless, given that computational complexity of inversion needed in solving the system of equations is generally large, there still remains the demand to further reduce computational complexity of solving a system of equations on a finite field, and to thereby reduce computational complexity of inverting an extension field element.

SUMMARY OF THE INVENTION

In view of the stated demand, the present invention aims to provide an apparatus, method, and storage medium storing a program for solving a system of equations on a finite field with reduced computational complexity, an apparatus, method, and storage medium storing a program for inverting an element in an extension field with reduced computational complexity, and a communication system and a record medium reproducing apparatus that utilize these apparatuses and methods.

The above object can be achieved by an apparatus for use in encryption or decryption, for solving a system of linear equations Ax=b in n unknowns on a finite field GF(p), where p is a prime, n is a positive integer, A is a coefficient matrix consisting of elements of n rows and n columns, x is a vector of unknowns consisting of n elements, and b is a constant vector consisting of n elements, the apparatus including: a parameter storing unit for storing the coefficient matrix A and the constant vector b; a triangular transforming unit for reading the coefficient matrix A and the constant vector b from the parameter storing unit, and transforming the read coefficient matrix A and constant vector b to generate a coefficient matrix C and a constant vector d for a system of linear equations Cx=d in n unknowns that is equivalent to the system of linear equations Ax=b, the coefficient matrix C consisting of elements of n rows and n columns and the constant vector d consisting of n elements, wherein the coefficient matrix A is triangular transformed into the coefficient matrix C of upper triangular form without diagonal elements of the coefficient matrix A being changed to 1; a diagonal element inverting unit for calculating inverses of diagonal elements of the generated coefficient matrix C on the finite field GF(p); and an equation computing unit for solving the system of linear equations Cx=d using the coefficient matrix C, the constant vector d, and the inverses of the diagonal elements of the coefficient matrix C, to thereby solve the system of linear equations Ax=b.

With this construction, the system of linear equations can be solved with reduced computational complexity.

Here, the triangular transforming unit may perform one or more successive transformation processes to generate the coefficient matrix C and the constant vector d of the system of linear equations Cx=d from the coefficient matrix A and the constant vector b of the system of linear equations Ax=b, wherein in each transformation process the triangular transforming unit transforms a coefficient matrix and a constant vector of a system of linear equations in n unknowns, into a coefficient matrix and a constant vector of a system of linear equations in n unknowns that is equivalent to the system of linear equations before the transformation, where the system of linear equations Ax=b is subjected to the first transformation process and the system of linear equations Cx=d is generated as a result of the last transformation process, wherein in each transformation process the system of linear equations in n unknowns that is subjected to the transformation includes one pivotal equation which is a linear equation serving as a pivot for the transformation and one or more object equations which are linear equations to be transformed, and the triangular transforming unit transforms each of the object equations into an equation equivalent to the object equation by defining a first coefficient group containing at least one value related to the pivotal equation and a second coefficient group containing n+1 values related to the pivotal equation, changing a nonzero coefficient in the object equation to 0, multiplying each of a constant and n coefficients in the object equation by the value in the first coefficient group, and subtracting the n+1 values in the second coefficient group respectively from the n+1 multiplication results.

With this construction, the triangular transformation is carried out without the diagonal elements of the coefficient matrix of the system of linear equations being converted to 1.

Here, each transformation process may have transformation subprocesses each for transforming a separate one of the object equations, wherein in each transformation subprocess the triangular transforming unit (a) chooses a nonzero coefficient from the pivotal equation and sets the chosen nonzero coefficient into the first coefficient group, (b) chooses a nonzero coefficient from the object equation, multiplies each of a constant and n coefficients in the pivotal equation by the nonzero coefficient chosen from the object equation, and sets n+1 values obtained by the multiplications into the second coefficient group, (c) changes the chosen nonzero coefficient in the object equation to 0, and (d) multiplies each of a constant and n coefficients in the object equation by the nonzero coefficient in the first coefficient group, and subtracts the n+1 values in the second coefficient group respectively from the n+1 multiplication results.

Here, each transformation process may have a coefficient group calculation process and transformation subprocesses, performed following the coefficient group calculation process, each for transforming a separate one of the object equations, wherein in the coefficient group calculation process the triangular transforming unit (a) chooses m nonzero coefficients by taking one nonzero coefficient from each of the pivotal equation and the object equations, multiplies each combination of (m−1) of the chosen nonzero coefficients, and sets the m multiplication results into the first coefficient group, m being a positive integer no smaller than 2, and (b) multiplies each of a constant and n coefficients in the pivotal equation by a multiplication result in the first coefficient group for a combination of nonzero coefficients that does not include a nonzero coefficient chosen from the pivotal equation, and sets n+1 values obtained by the multiplications into the second coefficient group, and wherein in each of the transformation subprocesses following the coefficient group calculation process, the triangular transforming unit (a) changes a nonzero coefficient chosen from the object equation in the coefficient group calculation process, to 0 in the object equation, and (b) multiplies each of a constant and n coefficients in the object equation by a multiplication result in the first coefficient group for a combination of nonzero coefficients that does not include the nonzero coefficient chosen from the object equation, and subtracts the n+1 values in the second coefficient group respectively from the n+1 multiplication results.

With these constructions, the equivalent system of linear equations can be obtained through the triangular transformation.

Here, when the diagonal elements of the coefficient matrix C are denoted by $m_i$ (i=1,2, ... , n) and the inverses of the diagonal elements $m_i$ (i=1,2, ... , n) in the finite field GF(p) are denoted by $I_i$ (i=1,2, ... , n), the diagonal element inverting unit may include (a) a multiplying unit for computing $$t_i = \prod_{k=1}^{n} m_k \text{ (except } m_i\text{) mod } p \quad (i = 1, 2, \ldots, n)$$

and $$t = \prod_{k=1}^{n} m_k \text{ mod } p$$

(b) a first inverting unit for computing $$u = 1/t \text{ mod } p$$

and (c) a second inverting unit for computing $$I_i = u \times t_i \text{ mod } p \quad (i=1,2, \ldots, n)$$

to find the inverses $I_i$ (i=1,2, ... ,n).

Here, the multiplying unit may calculate $$s_1 = m_1 \times m_2 \text{ mod } p$$

$$s_2 = s_1 \times m_3 \text{ mod } p$$

$$\vdots$$

$$s_{n-3} = s_{n-4} \times m_{n-2} \text{ mod } p$$

in the stated order, then calculate $$t_n = s_{n-3} \times m_{n-1} \text{ mod } p$$

$$t_{n-1} = s_{n-3} \times m_n \text{ mod } p$$

$$s_n = m_{n-1} \times m_n \text{ mod } p$$

$$t_{n-2} = s_{n-4} \times s_n \text{ mod } p$$

$$s_{n-1} = m_{n-2} \times s_n \text{ mod } p$$

$$t_{n-3} = s_{n-5} \times s_{n-1} \text{ mod } p$$

$$s_{n-2} = s_{n-3} \times s_{n-1} \text{ mod } p$$

$$t_{n-4} = s_{n-6} \times s_{n-2} \text{ mod } p$$

$$s_5 = m_4 \times s_6 \text{ mod } p$$

$$t_3 = s_1 \times s_5 \text{ mod } p$$

$$s_4 = m_3 \times s_5 \text{ mod } p$$

$$t_2 = m_1 \times s_4 \text{ mod } p$$

$$t_1 = m_2 \times s_4 \text{ mod } p$$

in the stated order, and lastly calculate $$t = t_j \times m_j$$

for a value j chosen from a set of positive integers $\{1, 2, \ldots, n\}$.

With these constructions, the number of inverse operations needed to compute the inverses of the diagonal elements can be reduced.

As a result, overall computational complexity of the apparatus for solving a system of equations on a finite field is reduced. Such an apparatus bears high practical value, as it enables high-speed cryptographic or digital signature processing.

The above object can also be achieved by an apparatus for use in encryption or decryption, for computing an inverse I of an element y in GF(q) which is an extension field of a finite field GF(p), where p is a prime, $q=p^n$, and n is a positive integer, the apparatus including: an equation generating unit for generating a coefficient matrix A and a constant vector b for a system of linear equations Ax=b in n unknowns, using the element y and all coefficients of a generator polynomial of GF(q) whose root is α; an equation solving unit for finding solutions of the system of linear equations Ax=b, the equation solving unit including the above apparatus for solving the system of linear equations Ax=b; and an inverse computing unit for computing the inverse I using the root α and the solutions found by the equation solving unit.

With this construction, the inverse of the extension field element can be computed with reduced computational complexity.

The above object can also be achieved by a record medium reproducing apparatus for computing, when copyrighted digital content has been encrypted using a discrete logarithm problem on an elliptic curve E over GF(q) as a basis for security and recorded on a record medium, an inverse I of an element y in GF(q) to decrypt the encrypted digital content recorded on the record medium, where GF(q) is an extension field of a finite field GF(p), p is a prime, q=p$^n$, n is a positive integer, and G is a base point of the elliptic curve E, the record medium reproducing apparatus including: an equation generating unit for generating a coefficient matrix A and a constant vector b for a system of linear equations Ax=b in n unknowns, using the element y and all coefficients of a generator polynomial of GF(q) whose root is $\alpha$; an equation solving unit for finding solutions of the system of linear equations Ax=b, the equation solving unit including the above apparatus for solving the system of linear equations Ax=b; and an inverse computing unit for computing the inverse I using the root $\alpha$ and the solutions found by the equation solving unit.

With this construction, the record medium reproducing apparatus can compute the inverse of the extension field element with reduced computational complexity.

BRIEF DESCRIPTION OF THE DRAWINGS

These and other objects, advantages and features of the invention will become apparent from the following description thereoftaken in conjunction with the accompanying drawings that illustrate a specific embodiment of the invention. In the drawings:

FIG. 6 shows an example of the triangular transformation by the equation transforming unit 102;

FIG. 8 shows an example of the triangular transformation by the equation transforming unit 102*a;*

FIG. 11 shows an example of the conventional triangular transformation.

DESCRIPTION OF THE PREFERRED EMBODIMENT(S)

1. Embodiment

The following is a description of an inversion apparatus 100 according to an embodiment of the present invention.

1.1. Construction of the Inversion Apparatus 100

The inversion apparatus 100 computes the inverse I of an element x on GF(q) (q=p$^n$, p a prime, n a positive integer) which is an extension field of a predetermined finite field GF(p). In this embodiment, a generator polynomial of the extension field GF(q) is g$^n$-$\beta$ whose root is $\alpha$, and the element x is such that x=x$_0$+x$_1\alpha$+ . . . +x$_{n-1}\alpha^{n-1}$, where $\alpha$ is an element of GF(q) and $\beta$, x$_0$, x$_1$, . . . x$_{n-1}$ are elements of GF(p).

Figure 1:
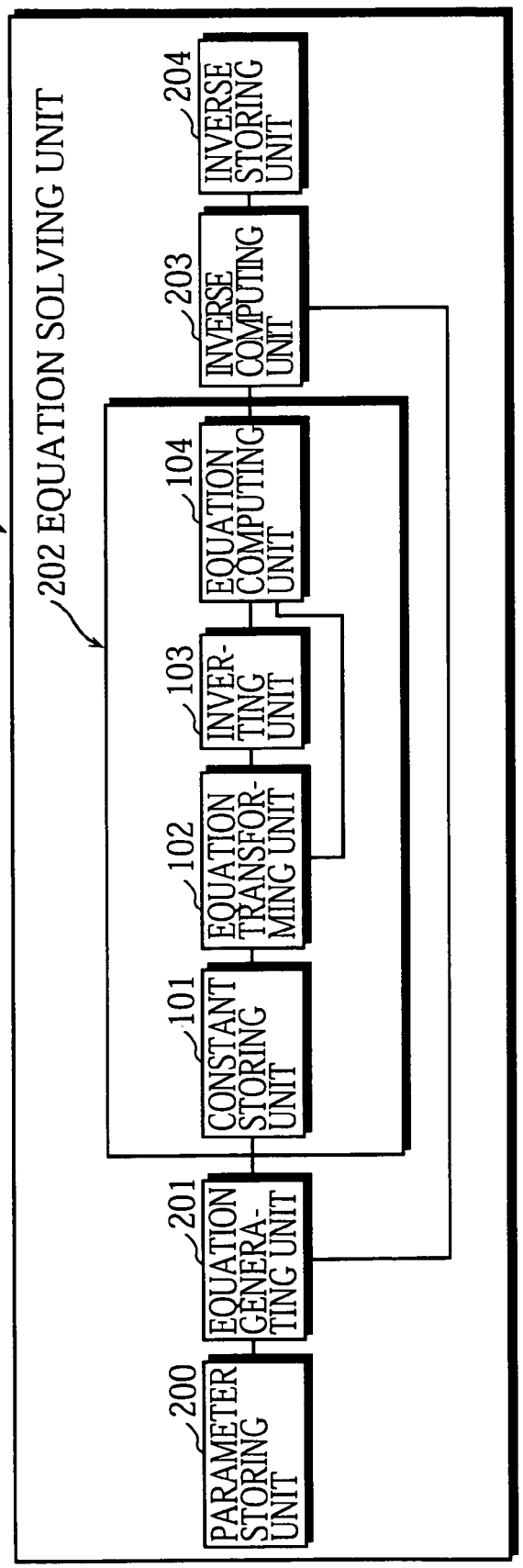
FIG. 1 is a block diagram showing the construction of an inversion apparatus 100 according to an embodiment of the invention.

As shown in FIG. 1, the inversion apparatus 100 is roughly made up of a parameter storing unit 200, an equation generating unit 201, an equation salving unit 202, an inverse computing unit 203, and an inverse storing unit 204.

Specifically, the inversion apparatus 100 is implemented by a computer system equipped with a microprocessor, a ROM, a RAM, a hard disk, and the like. Through execution of a computer program stored in the hard disk by the microprocessor, the equation generating unit 201, the equation solving unit 202, and the inverse computing unit 203 are realized.

(1) Parameter Storing Unit 200

The parameter storing unit 200 is implemented by the hard disk. The parameter $\beta$ of the generator polynomial, the root $\alpha$, and the elements x$_0$, x$_1$, . . . , x$_{n-1}$ are stored in the parameter storing unit 200 beforehand.

(2) Equation Generating Unit 201

The equation generating unit 201 reads $\beta$, $\alpha$, x$_0$, x$_1$, . . . , x$_{n-1}$ from the parameter storing unit 200, and generates parameters of the following system of equations of y$_i$ (i=0,1,2, . . . ,n-1)

$$x_0 y_0 + \beta x_{n-1} y_1 + \beta x_{n-2} y_2 + \ldots + \beta x_1 y_{n-1} = 1$$
$$x_1 y_0 + x_0 y_1 + \beta x_{n-1} y_2 + \ldots + \beta x_2 y_{n-1} = 0$$
$$x_2 y_0 + x_1 y_1 + x_0 y_2 + \ldots + \beta x_3 y_{n-1} = 0$$
$$\vdots$$
$$x_{n-1} y_0 + x_{n-2} y_1 + x_{n-3} y_2 + \ldots + x_0 y_{n-1} = 0$$

using the read values.

This system of equations can be written simply as $$AY=B$$

where A is a matrix and Y and B are vectors such that $$A = \begin{pmatrix} x_0 & \beta x_{n-1} & \beta x_{n-2} & \ldots & \beta x_1 \\ x_1 & x_0 & \beta x_{n-1} & \ldots & \beta x_2 \\ x_2 & x_1 & x_0 & \ldots & \beta x_3 \\ \vdots & \vdots & \vdots & \ldots & \vdots \\ x_{n-1} & x_{n-2} & x_{n-3} & \ldots & x_0 \end{pmatrix}$$

$$Y = \begin{pmatrix} y_0 \\ y_1 \\ y_2 \\ \vdots \\ y_{n-1} \end{pmatrix}$$

$$B = \begin{pmatrix} 1 \\ 0 \\ 0 \\ \vdots \\ 0 \end{pmatrix}$$

The parameters of the system of equations generated by the equation generating unit 201 are the matrix A and the vector B. The equation generating unit 201 outputs the generated matrix A and vector B to the equation solving unit 202.

The equation generating unit 201 also outputs α read from the parameter storing unit 200, to the inverse computing unit 203.

(3) Equation Solving Unit 202

The equation solving unit 202, when given parameters $a_{ij}$ (i,j=1,2, . . . ,n) and $b_k$ (k=1,2, . . . ,n) of the following system of linear equations in n unknowns for $x_i$ (i=1,2, . . . ,n) on a predetermined finite field GF(p) (p a prime), solves the system of linear equations in n unknowns on GF(p).

$$a_{11}x_1 + a_{12}x_2 + \ldots + a_{1n}x_n = b_1$$
$$a_{21}x_1 + a_{22}x_2 + \ldots + a_{2n}x_n = b_2$$
$$\vdots$$
$$a_{n1}x_1 + a_{n2}x_2 + \ldots + a_{nn}x_n = b_n$$

The equation solving unit 202 includes a constant storing unit 101, an equation transforming unit 102, an inverting unit 103, and an equation computing unit 104, as shown in FIG. 1.

(Constant Storing Unit 101)

The constant storing unit 101 is implemented by the RAM. The constant storing unit 101 receives a matrix M and a vector v from the equation generating unit 201 and stores them. Here, the matrix M and the vector v are respectively $$M = \begin{pmatrix} a_{11} & a_{12} & \ldots & a_{1n} \\ a_{21} & a_{22} & \ldots & a_{2n} \\ \bullet & \bullet & \bullet & \bullet \\ \bullet & \bullet & \bullet & \bullet \\ a_{n1} & a_{n2} & \ldots & a_{nn} \end{pmatrix}$$

$$v = \begin{pmatrix} b_1 \\ b_2 \\ \bullet \\ \bullet \\ b_n \end{pmatrix}.$$

For example, the matrix M is the matrix A and the vector v is the vector B.

(Equation Transforming Unit 102)

The equation transforming unit 102 reads the matrix M and the vector v from the constant storing unit 101 and triangular transforms the read matrix M and vector v, to generate a matrix M' (a coefficient matrix consisting of n rows and n columns) and a vector v' (a constant vector consisting of n elements) for a system of linear equations M'x=v' in n unknowns that is equivalent to a system of linear equations Mx=v in n unknowns.

In the triangular transformation, the equation transforming unit 102 transforms the matrix M into an upper triangular matrix without changing each diagonal element of the matrix M to 1.

Such generated matrix M' and vector v' are $$M' = \begin{pmatrix} c_{11} & c_{12} & \ldots & c_{1n} \\ c_{21} & c_{22} & \ldots & c_{2n} \\ \bullet & \bullet & \bullet & \bullet \\ \bullet & \bullet & \bullet & \bullet \\ c_{n1} & c_{n2} & \ldots & c_{nn} \end{pmatrix}$$

$$v' = \begin{pmatrix} d_1 \\ d_2 \\ \bullet \\ \bullet \\ d_n \end{pmatrix}$$

This triangular transformation is carried out in the following way.

In the triangular transformation, one or more successive transformation processes are performed to generate the matrix M' and vector v' of the system of linear equations M'x=v' from the system of linear equations Mx=v.

In each transformation process, the equation transforming unit 102 generates, from a system of linear equations in n unknowns, a coefficient matrix and a constant vector for a system of linear equations in n unknowns that is equivalent to the system of linear equations before the transformation. In this embodiment, a system of linear equations in n unknowns that is subjected to the initial transformation process is the system of linear equations Mx=v, whereas a system of linear equations in n unknowns that is obtained as a result of the last transformation process is the system of linear equations M'x=v'.

In each transformation process, a system of linear equations in n unknowns before the transformation includes one linear equation as a pivotal equation serving as the transformation pivot and one or more linear equations as object equations to be transformed.

Each transformation process has transformation subprocesses as many as the object equations in the system of linear equations, each for transforming a separate one of the object equations to an equation equivalent to the object equation. Before transforming the object equation to the equivalent equation, a first coefficient group and a second coefficient group are defined in each transformation subprocess.

The first and second coefficient groups are each a group that contains at least one value related to the pivotal equation. To be more specific, the equation transforming unit 102 sets one nonzero coefficient of the pivotal equation into the first coefficient group. Also, the equation transforming unit 102 multiplies each of a constant and n coefficients of the pivotal equation by one nonzero coefficient of the object equation, and sets n+1 values obtained as a result into the second coefficient group.

Following this, the equation transforming unit 102 changes the nonzero coefficient of the object equation to 0. The equation transforming unit 102 then multiplies each of a constant and n coefficients of the object equation by the value in the first coefficient group, and subtracts the n+1 values in the second coefficient group respectively from the n+1 multiplication results. In so doing, the object equation is transformed into the equivalent equation where one of its nonzero coefficients has become 0.

This triangular transformation will be explained in greater detail later.

The equation transforming unit 102 outputs the generated matrix M' and vector v' to the equation computing unit 104, and outputs the diagonal elements $c_{ii}$ (i=1,2, . . . ,n) of the matrix M' to the inverting unit 103.

As described earlier, when transforming the matrix M into upper triangular form, the equation transforming unit 102 also transforms the vector v so as not to alter the solutions of the system of linear equations Mx=v. The difference with the conventional triangular transformation lies in that the diagonal elements of the matrix M are not converted to 1.

(Inverting Unit 103)

The inverting unit 103 receives the diagonal elements $c_{ii}$ (i=1,2, . . . ,n) of the matrix M' from the equation transforming unit 102.

For simplicity's sake, the diagonal elements $c_{ii}$ (i=1,2, . . . ,n) of the matrix M' are expressed as $m_i$ (i=1,2, . . . ,n) here.

The inverting unit 103 solves $$t_i = \prod_{k=1}^{n} m_k \text{ (except } m_i\text{) mod } p \ (i = 1, 2, \ldots, n)$$

by first calculating $$s_1 = m_1 \times m_2 \bmod p$$
$$s_2 = s_1 \times m_3 \bmod p$$
$$\vdots$$
$$s_{n-3} = s_{n-4} \times m_{n-2} \bmod p$$
$$t_n = s_{n-3} \times m_{n-1} \bmod p$$
$$t_{n-1} = s_{n-3} \times m_n \bmod p$$
$$s_n = m_{n-1} \times m_n \bmod p, \quad t_{n-2} = s_{n-4} \times s_n \bmod p$$
$$s_{n-1} = m_{n-2} \times s_n \bmod p, \quad t_{n-3} = s_{n-5} \times s_{n-1} \bmod p$$
$$s_{n-2} = m_{n-3} \times s_{n-1} \bmod p, \quad t_{n-4} = s_{n-6} \times s_{n-2} \bmod p$$
$$\vdots$$
$$s_5 = m_4 \times s_6 \bmod p, \quad t_3 = s_1 \times s_5 \bmod p$$
$$s_4 = m_3 \times s_5 \bmod p, \quad t_2 = m_1 \times s_4 \bmod p$$
$$t_1 = m_2 \times s_4 \bmod p$$

in this order. The inverting unit 103 then calculates $$t = t_k \times m_k \bmod p$$

using a predetermined value k (chosen from a set of positive integers {1, 2, . . . , n}), and thereby solves $$t = \prod_{i=1}^{n} m_i \bmod p$$

The inverting unit 103 next computes $$u = 1/t \bmod p$$

and finally obtains the inverses $I_i$ (i=1,2, . . . , n) by $$I_i = u \times t_i \bmod p \ (i=1,2, \ldots n)$$

The inverting unit 103 outputs the inverses $I_i$ (i=1,2, . . . n) to the equation computing unit 104.

Thus, the inverting unit 103 computes, on GF(p), the inverses $I_i$ (i=1,2, . . . , n) of the diagonal elements $c_{ii}$ (i=1,2, . . . , n) of the matrix M' which are given from the equation transforming unit 102.

(Equation Computing Unit 104)

The equation computing unit 104 receives the matrix M' and the vector v' from the equation transforming unit 102, and also receives the inverses $I_i$ (i=1,2, . . . ,n) from the inverting unit 103.

The equation computing unit 104 sets the values n−1, n−2, . . . , 2, 1, 0 in counter j one at a time. For counter j, the equation computing unit 104 uses the matrix M', the vector v', and the inverses $I_i$ (i=1,2, . . . ,n) to compute $$y_j = I_{j+1} \times d_{j+1} \bmod p$$

when j=n−1, and compute $$y_j = I_{j+1} \times \left( d_{j+1} - \sum_{i=j+1}^{n-1} c_{j+1\ i+1} \times y_i \right) \bmod p$$

when j≠n−1.

The equation computing unit 104 then outputs the solutions $y_j$ (j=0,1,2, . . . ,n−1) to the inverse computing unit 203.

The reason that the solutions of the system of linear equations in n unknowns can be found by the equation computing unit 104 is shown below.

Since the matrix M' received from the equation transforming unit 102 is an upper triangular matrix, the system of linear equations M'x=v' can be written as $$c_{11}x_0 + c_{12}x_1 + c_{13}x_2 + \ldots + c_{1n}x_{n-1} = d_1$$
$$c_{22}x_1 + c_{23}x_2 + \ldots + c_{2n}x_{n-1} = d_2$$
$$\vdots$$
$$c_{nn}x_{n-1} = d_n$$

with the inverses of the diagonal elements $c_{ii}$ (i=1,2, . . . ,n) of the matrix M' being $I_i$ (i=1,2, . . . ,n). Accordingly, the solution $y_{n-1}$ of $x_{n-1}$ is $$y_{n-1} = I_n d_{n-1} \bmod p$$

the solution $y_{n-2}$ of $x_{n-2}$ is $$y_{n-2} = I_{n-1}(d_{n-1} - c_{n-1\ n} y_{n-1}) \bmod p$$

and the solutions $y_j$ (j=n−3,n−4, . . . ,0) of $x_j$ are $$y_j = I_{j+1} \times \left( d_{j+1} - \sum_{i=j+1}^{n-1} c_{j+1\ i+1} y_i \right) \bmod p$$

(4) Inverse Computing Unit 203

The inverse computing unit 203 receives the solutions $y_j$ (j=0,1,2, . . . ,n−1) from the equation computing unit 104 in the equation solving unit 202, and receives the root α from the equation generating unit 201. The inverse computing unit 203 calculates the inverse I according to the equation $$I = y_0 + y_1 \alpha + \ldots + y_{n-1} \alpha^{n-1}$$

using the received solutions $y_j$ (j=0,1,2, . . . ,n−1) and root α. The inverse computing unit 203 writes the calculated inverse I into the inverse storing unit 204.

Hence the inverse I of the element x in the extension field GF(q) is obtained.

(5) Inverse Storing Unit 204

The inverse storing unit 204 is implemented by the hard disk and stores the inverse I of the element x of the extension field GF(q).

1.2. Operation of the Inversion Apparatus 100

The following is a description on the operation of the above constructed inversion apparatus 100.

(1) General Operation of the Inversion Apparatus 100

Figure 2:
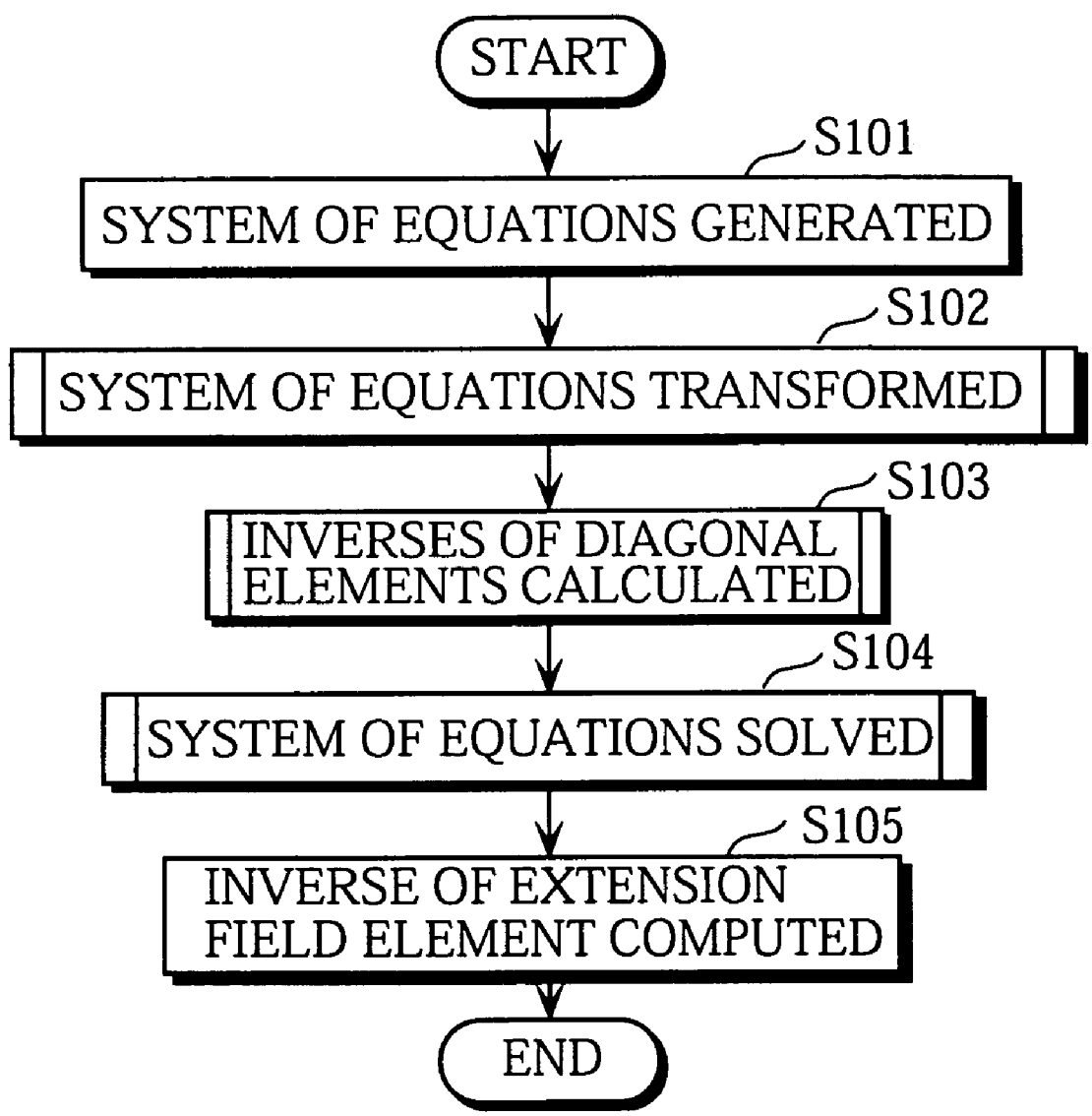
FIG. 2 is a flowchart showing the general operation of the inversion apparatus 100.

The general operation of the inversion apparatus 100 is explained below with reference to FIG. 2.

The equation generating unit 201 reads the parameter $\beta$, the root $\alpha$, and $x_0, x_1, \ldots, x_{n-1}$ from the parameter storing unit 200, and uses them to generate the matrix A and the vector B as the parameters of the system of linear equations AY=B in n unknowns for $y_i$ (i=0,1,2,...,n−1). The equation generating unit 201 outputs the generated matrix A and vector B to the constant storing unit 101 in the equation solving unit 202, and outputs the root $\alpha$ to the inverse computing unit 203 (S101).

The equation transforming unit 102 in the equation solving unit 202 reads the matrix M and the vector v from the constant storing unit 101 and triangular transforms the read matrix M and vector v, as a result of which the matrix M' and the vector v' for the system of linear equations M'x=v' in n unknowns, that is equivalent to the system of linear equations M'x=v, are generated (S102).

The inverting unit 103 in the equation solving unit 202 calculates the inverses $I_i$ (i=1,2,...,n) of the diagonal elements $c_{ii}$ (i=1,2,...,n) of the matrix M' (S103).

The equation computing unit 104 in the equation solving unit 202, through the use of the matrix M', the vector v', and the inverses $I_i$ (i=1,2,...,n), seeks the solutions $y_j$ (j=0,1,2,..., n−1) of the system of linear equations M'x=v', and outputs the solutions $y_j$ (j=0,1,2,...,n−1) to the inverse computing unit 203 (S104).

The inverse computing unit 203 receives the solutions $y_j$ (j=0,1,2,...,n−1) from the equation computing unit 104 and the root $\alpha$ from the equation generating unit 201, finds the inverse I of the element x in the extension field GF(q) using the received solutions and root, and writes the inverse I into the inverse storing unit 204 (S105).

(2) Operation of Triangular Transformation by the Equation Transforming Unit 102

The operation of the triangular transformation by the equation transforming unit 102 is explained in detail below with reference to FIG. 3.

The equation transforming unit 102 reads the matrix M and the vector v from the constant storing unit 101 (S111), and sets counter j at 1 (S112).

The equation transforming unit 102 searches the jth column of the matrix M from the jth to nth rows for an element which is not 0 on GF(p), and sets the row number of a nonzero element found first as k (S113). Here, if k≠j (S114), the equation transforming unit 102 changes places between the kth row and the jth row in the matrix M (S115), and changes places between the kth row and the jth row in the vector v (S116).

The equation transforming unit 102 sets counter i at j+1 (S117) and makes the following settings using $a_{jj}$ (the element in the jth row and jth column of the matrix M) and $a_{ij}$:

$$a_{ij}=0$$

$$a_{ik}=a_{jj}a_{ik}-a_{ij}a_{jk} \text{ for } j+1 \leq k \leq n \ (k=j+1,j+2,\ldots,n)$$

$$b_i=a_{jj}b_i-a_{ij}b_j$$

(S118).

The equation transforming unit 102 then judges whether i=n (S119). If i≠n, the equation transforming unit 102 increments counter i by 1 (S122) and returns to step S118. If i=n, the equation transforming unit 102 judges whether j=n−1 (S120). If j≠n−1, the equation transforming unit 102 increments counter j by 1 (S123) and returns to step S113. If j=n−1, the equation transforming unit 102 sets the matrix M as the matrix M' and the vector v as the vector v', and completes the operation.

As described above, this triangular transformation includes transformation processes which correspond to the separate values of counter j, and each of the transformation processes includes transformation subprocesses which correspond to the separate values of counter i.

(Reason for Equivalence Between Mx=V and M'X=V')

The reason why the system of linear equations M'x=v' generated as a result of the triangular transformation by the equation transforming unit 102 is equivalent to the system of linear equations Mx=v is given below.

In each transformation process of the triangular transformation, let $M_{in}$ and $v_{in}$ be a matrix and a vector before the transformation, $M_{out}$ and $v_{out}$ be a matrix and a vector after the transformation, and $L_i$ and $L_j$ be the ith and jth row vectors of the matrix $M_{in}$.

The equation transforming unit 102 calculates $$a_{jj} \times L_i - a_{ij} \times L_j$$

and, having set the resulting row vector as the ith row of the matrix $M_{out}$, calculates $$a_{jj} \times b_i - a_{ij} \times b_j$$

the outcome of which is set as the ith row of the vector $v_{out}$. The other elements of $M_{out}$ and the other elements of $v_{out}$ are respectively equal to the other elements of $M_{in}$ and the other elements of $v_{in}$. This being the case, the system of linear equations $$M_{in} \cdot x = v_{in}$$

and the system of linear equations $$M_{out} \cdot x = v_{out}$$

have the same solutions, as demonstrated in document 2.

Also, the equation transforming unit 102 defines $a_{ij}=0$ for every i that satisfies j+1≤i≤n. Repeating this process from j=1 to j=n renders all elements in the lower triangle of the matrix 0. Thus, the matrix can be triangular transformed without the solutions of the system of linear equations being altered.

(3) Operation of the Inverting Unit 103

Figure 4:
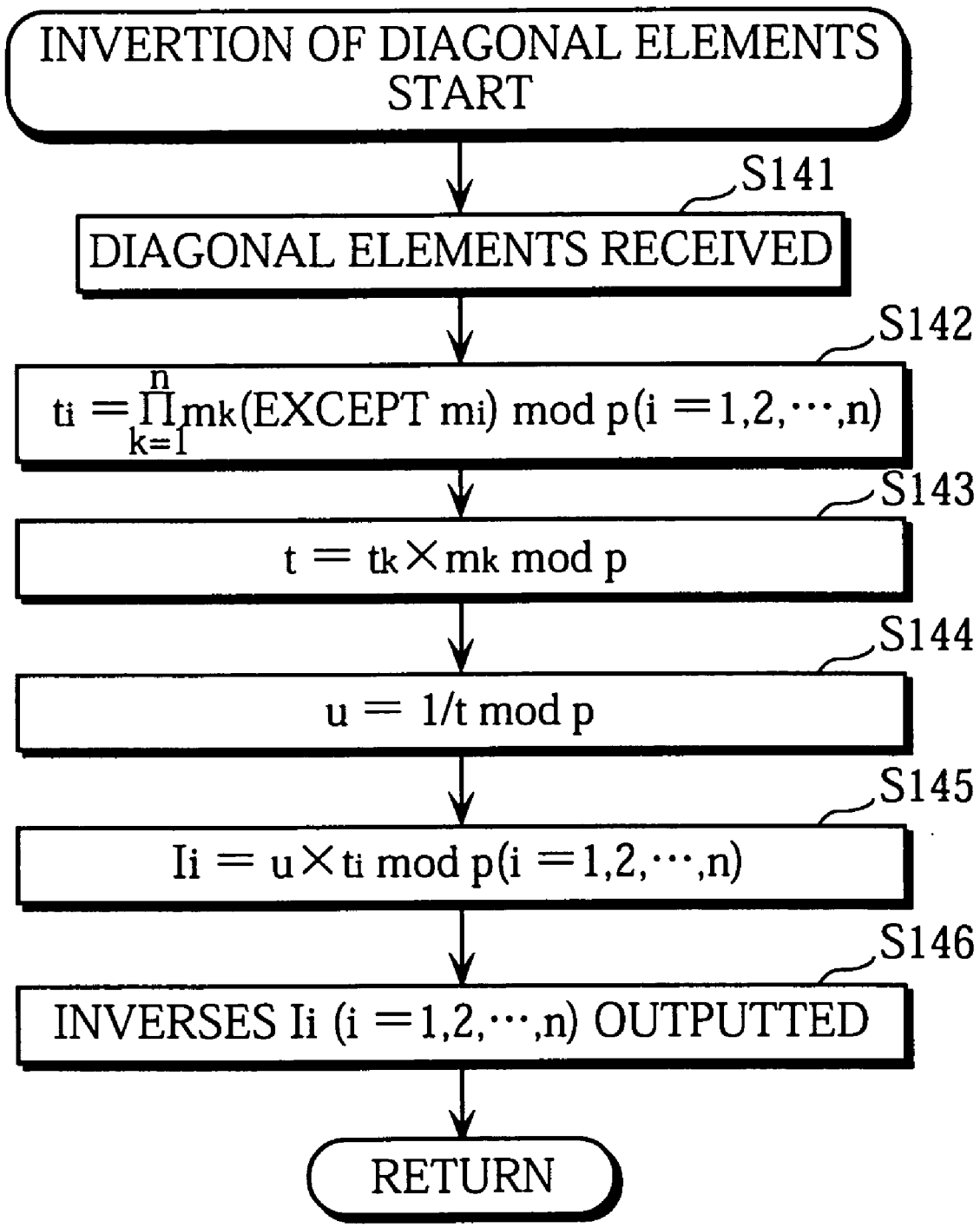
FIG. 4 is a flowchart showing the operation of inverting diagonal elements of the coefficient matrix in the inversion apparatus 100.

The operation of the inverting unit 103 is explained in detail below with reference to FIG. 4.

The inverting unit 103 receives the diagonal elements $m_i$ (i=1,2,...,n) of the matrix M' from the equation transforming unit 102 (S141), and computes $$t_i = \prod_{k=1}^{n} m_k \text{ (except } m_i\text{) mod } p \ (i = 1, 2, \ldots, n)$$

(S142). The inverting unit 103 then computes $$t = t_k \times m_k \bmod p$$

using the predetermined value k (S143), and also computes $$u = 1/t \bmod p$$

(S144). The inverting unit 103 finally finds the inverses $$I_i = u \times t_i \bmod p \ (i=1,2,\ldots,n)$$

(S145), and outputs the inverses $I_i$ (i=1,2, . . . ,n) to the equation computing unit 104 (S146).

(4) Operation of the Equation Computing Unit 104

Figure 5:
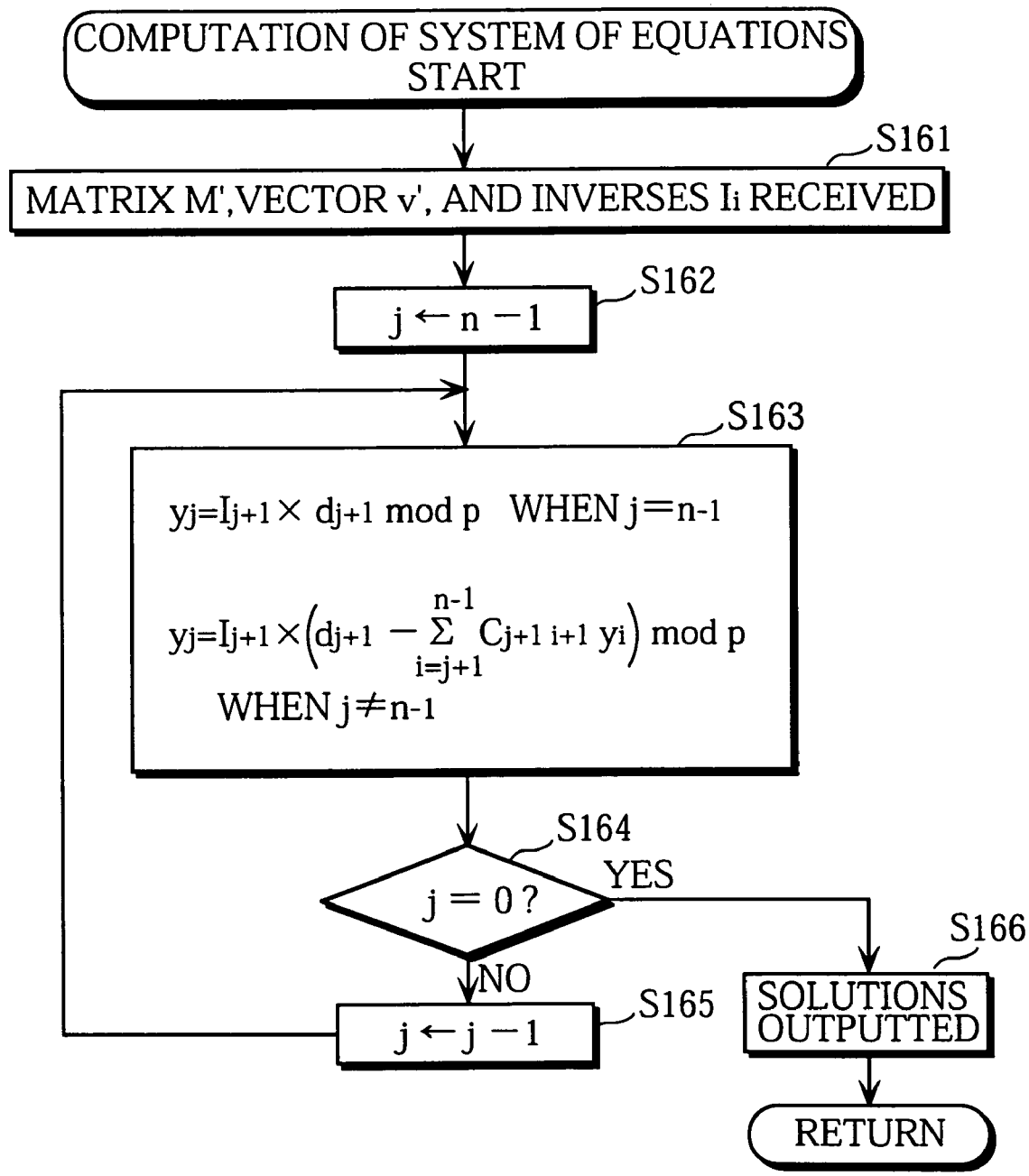
FIG. 5 is a flowchart showing the operation of solving the system of equations in the inversion apparatus 100.

The operation of the equation computing unit 104 is explained in detail below with reference to FIG. 5.

The equation computing unit 104 receives the matrix M' and the vector v' from the equation transforming unit 102, and receives the inverses $I_i$ (i=1,2, . . . ,n) from the inverting unit 103 (S161). Having set counter j at n−1 (S162), the equation computing unit 104 computes $$y_j = I_{j+1} \times d_{j+1} \bmod p$$

when j=n−1, and computes $$y_j = I_{j+1} \times \left( d_{j+1} - \sum_{i=j+1}^{n-1} c_{j+1\ i+1} \times y_i \right) \bmod p$$

when j≠n−1 (S163)

The equation computing unit 104 judges whether j=0 (S164). If j=0, the equation computing unit 104 outputs the solutions $y_j$(j=0,1,2, . . . ,n−1) to the inverse computing unit 203 (S166). Otherwise, the equation computing unit 104 decrements counter j by 1 (S165) and returns to step S163.

1.3. Computational Complexity

The computational complexity of the equation solving unit 202 is evaluated below.

(1) Computational Complexity of the Equation Transforming Unit 102

In the equation transforming unit 102, computational complexity for one value of counter j (steps S113~S119 in FIG. 3) is the following.

First, computational complexity for one value of counter i (step S118) is broken down as shown below.

(a) In step S118, the calculation $a_{ik} = a_{jj} \times a_{ik} - a_{ij} \times a_{jk}$ is performed for j+1≦k≦n (k=j+1,j+2, . . . ,n). This means two multiplications are repeated (n−(j+1)+1)=(n−j) times, so that computational complexity is (2×(n−j))Mul.

(b) In step S118, the calculation $b_i = a_{jj} \times b_i - a_{ij} \times b_j$ involves two multiplications, so that computational complexity is 2Mul.

Since counter i changes from j+1 to n, the computational complexity of steps S113~S119 for one value of counter j is $$(2\times(n-j))Mul \times (n-(j+1)+1) = (2\times(n-j)\times(n-j+1))Mul$$

In steps S112~S120, counter j changes from 1 to n−1, so that the overall computational complexity of the equation transforming unit 102 is $$\sum_{j=1}^{n-1} (2 \times (n-j) \times (n-j+1))Mul =$$

$$2Mul \times \sum_{j=1}^{n-1} j(j+1) = 2Mul \times \left( \sum_{j=1}^{n-1} j^2 + \sum_{j=1}^{n-1} j \right) =$$

$$2Mul \times (1/6 \times n(n-1)(2n-1) + 1/2 \times n(n-1)) =$$

$$2Mul \times 1/6 \times n(n-1)(2n-1+3) =$$

$$1/3Mul \times n(n-1)(2n+2) = (2/3 \times n(n-1)(n+1))Mul$$

(2) Computational Complexity of the Inverting Unit 103

The computational complexity of the inverting unit 103 can be broken down as follows.

(a) Finding $s_1 \sim s_{n-3}$ $t_n$ requires n−2 multiplications, so that computational complexity is (n−2)Mul.

(b) Finding $t_{n-1}$ requires one multiplication, so that computational complexity is 1Mul.

(c) Finding $s_n$ and $t_{n-1}$, $s_{n-1}$ and $t_{n-3}$, . . . , and $s_4$ and $t_2$ requires 2×(n−3) multiplications, so that computational complexity is (2×(n−3))Mul.

(d) Finding $t_1$ requires one multiplication, so that computational complexity is 1Mul.

(e) Finding t requires one multiplication, so that computational complexity is 1Mul.

(f) Finding u=1/t mod p requires one inversion, so that computational complexity is 1Inv.

(g) Finding $I_i = u \times t_i$ mod p (i=1,2, . . . ,n) requires n multiplications, so that computational complexity is nMul.

Summing these computational complexity gives the total computational complexity of the inverting unit 103 as $$((n-2)+1+2(n-3)+1+1+n)Mul+1Inv=(4n-5)Mul+1Inv$$

(3) Computational Complexity of the Equation Computing Unit 104

In the equation computing unit 104, computational complexity for one value of counter j (steps S163~S165 in FIG. 5) is as follows.

To compute $$y_j = I_{j+1} \times d_{j+1} \bmod p$$

when j=n−1 and $$y_j = I_{j+1} \times \left( d_{j+1} - \sum_{i=j+1}^{n-1} c_{j+1\ i+1} y_i \right) \bmod p$$

when j≠n−1, one multiplication and (n−(j+1)+1) multiplications are needed, which makes the computational complexity of (n−j+1)Mul.

Since counter j changes from 1 to n, the total computational complexity of the equation computing unit 104 is $$\sum_{j=1}^{n} (n-j+1)Mul = \sum_{j=1}^{n} jMul = (1/2 \times n(n+1))Mul$$

(4) Total Computational Complexity of the Equation Solving Unit 202

From the foregoing description, the total computational complexity of the equation solving unit 202 is given by $$(2/3 \times n(n-1)(n+1))Mul + (4n-5)Mul + 1Inv + (1/2 \times n(n+1))Mul = (1/6(4n^3 + 3n^2 + 23n - 30))Mul + 1Inv$$

Supposing 1Inv=40Mul in a general-purpose computer when n=5 and |q|=160 (|q| is the bit size of q), the total computational complexity of the equation solving unit 202 can be estimated at 150Mul.

Thus, the computational complexity of the equation solving unit 202 of the invention is much smaller than that of the prior art. Such an equation solving unit bears huge practical value, as it enables an apparatus to solve a system of equations on a finite field with reduced computational complexity.

Also, such an equation solving unit enables an apparatus to compute an inverse I of an element x in an extension field GF(q) of a predetermined finite field GF(p) with reduced computational complexity.

1.4. Concrete Example

The following is a concrete example of the operation of the equation solving unit 202.

As with the prior art 3, a prime p=31, a generator polynomial $f(g)=g^5-2$, and an element $x=5\alpha^4+29\alpha^3+6\alpha^2+19\alpha+17$ of GF(q) are given. A system of equations to be solved is the same as that in the prior art 3, as shown in FIG. 6(*a*).

The following calculations are performed:

$a_{21}=0$ $a_{22}=17 \times 17 - 19 \times 10 = 6 \bmod 31$ $a_{23}=17 \times 10 - 19 \times 27 = 29 \bmod 31$ $a_{24}=17 \times 27 - 19 \times 12 = 14 \bmod 31$ $a_{25}=17 \times 12 - 19 \times 7 = 9 \bmod 31$ $b_2=17 \times 0 - 19 \times 1 = 12 \bmod 31$ When j=1 (i=2), the system of equations is transformed as shown in FIG. 6(*b*). Here, the element in the first column and second row has become 0 in a coefficient matrix 411.

As a result of the transformation process for j=1, the system of equations has become as shown in FIG. 6(*c*), where the elements in the first column and third to fifth rows are 0 in a coefficient matrix 421.

As a result of the transformation process for j=2, the system of equations has become as shown in FIG. 6(*d*), where the elements in the second column and third to fifth rows are 0 in a coefficient matrix 431.

As a result of the transformation process for j=3, the system of equations has become as shown in FIG. 6(*e*), where the elements in the third column and fourth to fifth rows are 0 in a coefficient matrix 441.

As a result of the transformation process for j=4, the system of equations has become as shown in FIG. 6(*f*), where the element in the fourth column and fifth row is 0 in a coefficient matrix 451.

Next, the diagonal elements in the coefficient matrix 451 are inverted by calculating $s_1=m_1 \times m_2 = 17 \times 6 = 9 \bmod 31$ $s_2=s_1 \times m_3 = 9 \times 17 = 29 \bmod 31$ $t_5=s_2 \times m_4 = 29 \times 6 = 19 \bmod 31$ $t_4=s_2 \times m_5 = 29 \times 30 = 2 \bmod 31$ $s_5=m_4 \times m_5 = 6 \times 30 = 25 \bmod 31$ $t_3=s_1 \times s_5 = 9 \times 25 = 8 \bmod 31$ $s_4=m_3 \times s_5 = 17 \times 25 = 22 \bmod 31$ $t_2=m_1 \times s_4 = 17 \times 22 = 2 \bmod 31$ $t_1=m_2 \times s_4 = 6 \times 22 = 8 \bmod 31$ $t=m_1 \times t_1 = 17 \times 8 = 12 \bmod 31$ $u=1/t=1/12=13 \bmod 31$ $I_1=u \times t_1 = 13 \times 8 = 11 \bmod 31$ $I_2=u \times t_2 = 13 \times 2 = 26 \bmod 31$ $I_3=u \times t_3 = 13 \times 8 = 11 \bmod 31$ $I_4=u \times t_4 = 13 \times 2 = 26 \bmod 31$ $I_5=u \times t_5 = 13 \times 19 = 30 \bmod 31$ Notice that u=1/t=1/12=13 mod 31 is the only inverse operation here.

Lastly, the system of equations is solved in the following way:

$$y_4 = I_5 \times d_5 = 30 \times 2 = 29 \bmod 31$$

$$y_3 = I_4 \times (d_4 - c_{45} \times y_4)$$
$$= 26 \times (28 - 2 \times 29) = 26 \bmod 31$$

$$y_2 = I_3 \times (d_3 - c_{34} \times y_3 - c_{35} \times y_4)$$
$$= 11 \times (1 - 6 \times 26 - 11 \times 29) = 25 \bmod 31$$

$$y_1 = I_2 \times (d_2 - c_{23} \times y_2 - c_{24} \times y_3 - c_{25} \times y_4)$$
$$= 26 \times (12 - 29 \times 25 - 14 \times 26 - 9 \times 29)$$
$$= 25 \bmod 31$$

$$y_0 = I_1 \times (d_1 - c_{12} \times y_1 - c_{13} \times y_2 - c_{14} \times y_3 - c_{15} \times y_4)$$
$$= 11 \times (1 - 10 \times 25 - 27 \times 25 - 12 \times 26 - 7 \times 29)$$
$$= 12 \bmod 31$$

1.5. Applications

In application of the present invention to an actual communication system such as a cryptographic communication system, a digital signature communication system, or an error correction communication system, parameters such as follows are used.

For a prime $p=2^{31}-1$, $q=p^n$, n=5, a generator polynomial $f(g)=g^5-g-8$, and an element $x=x_0+x_1 \times \alpha + x_2 \times \alpha^2 + x_3 \times \alpha^3 + x_4 \times \alpha^4$ of GF(q), a system of equations is defined as $$\begin{pmatrix} x_0 & 8x_4 & 8x_3 & 8x_2 & 8x_1 \\ x_1 & x_0+x_4 & x_3+8x_4 & x_2+8x_3 & x_1+8x_2 \\ x_2 & x_1 & x_0+x_4 & x_3+8x_4 & x_2+8x_3 \\ x_3 & x_2 & x_1 & x_0+x_4 & x_3+8x_4 \\ x_4 & x_3 & x_2 & x_1 & x_0+x_4 \end{pmatrix} \begin{pmatrix} y_0 \\ y_1 \\ y_2 \\ y_3 \\ y_4 \end{pmatrix} = \begin{pmatrix} 1 \\ 0 \\ 0 \\ 0 \\ 0 \end{pmatrix}$$

where p, $x_0, \ldots, x_4$, and $y_0, \ldots, y_4$ are each 31 bits long, and q and x are each 155 bits long.

2. Modifications 2.1. Variant

As a variant of the equation transforming unit 102 in the equation solving unit 202, an equation transforming unit 102a is explained below.

In the equation transforming unit 102a, each transformation process has one coefficient group calculation process and subsequent transformation subprocesses as many as object equations, each for transforming a separate one of the object equations.

In the coefficient group calculation process, the equation transforming unit 102a chooses m nonzero coefficients by taking one nonzero coefficient from each of the pivotal equation and the object equations in the coefficient matrix consisting of n rows and n columns, multiplies each combination of (m−1) of the chosen nonzero coefficients, and sets the m multiplication results into a first coefficient group. The equation transforming unit 102a then multiplies each of a constant and n coefficients of the pivotal equation by the multiplication result in the first coefficient group for a combination of nonzero coefficients that does not include the nonzero coefficient of the pivotal equation, and sets n+1 values obtained as a result into a second coefficient group.

Following this, in each of the transformation subprocesses the equation transforming unit 102a changes a nonzero coefficient chosen from an object equation to 0, multiplies each of a constant and n coefficients of the object equation by the multiplication result in the first coefficient group for a combination of nonzero coefficients that does not include the nonzero coefficient of the object equation, and subtracts the n+1 values in the second coefficient group respectively from the n+1 multiplication results.

Figure 7:
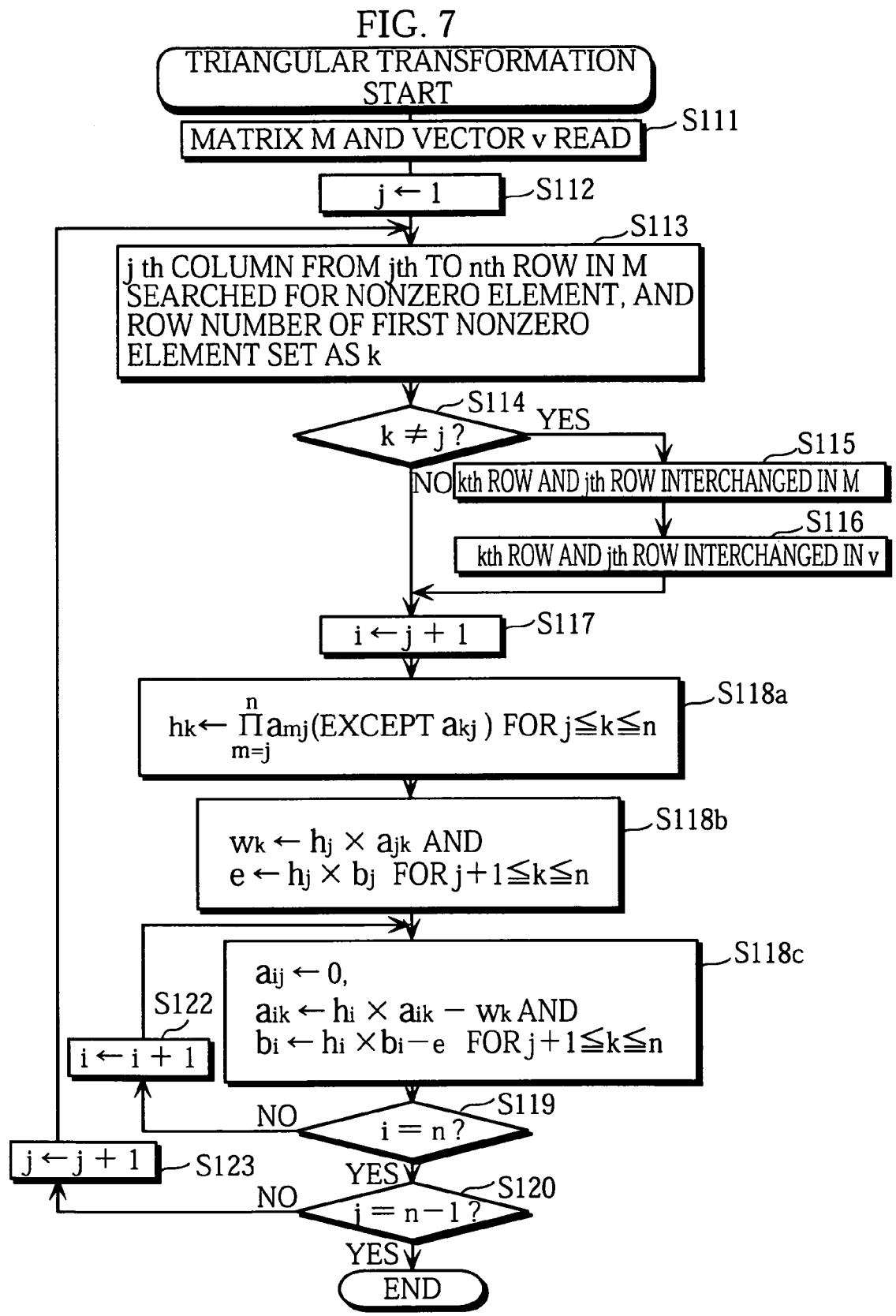
FIG. 7 is a flowchart showing the operation of triangular transforming a coefficient matrix by an equation transforming unit 102*a* as a variant of the invention.
Figure 9:
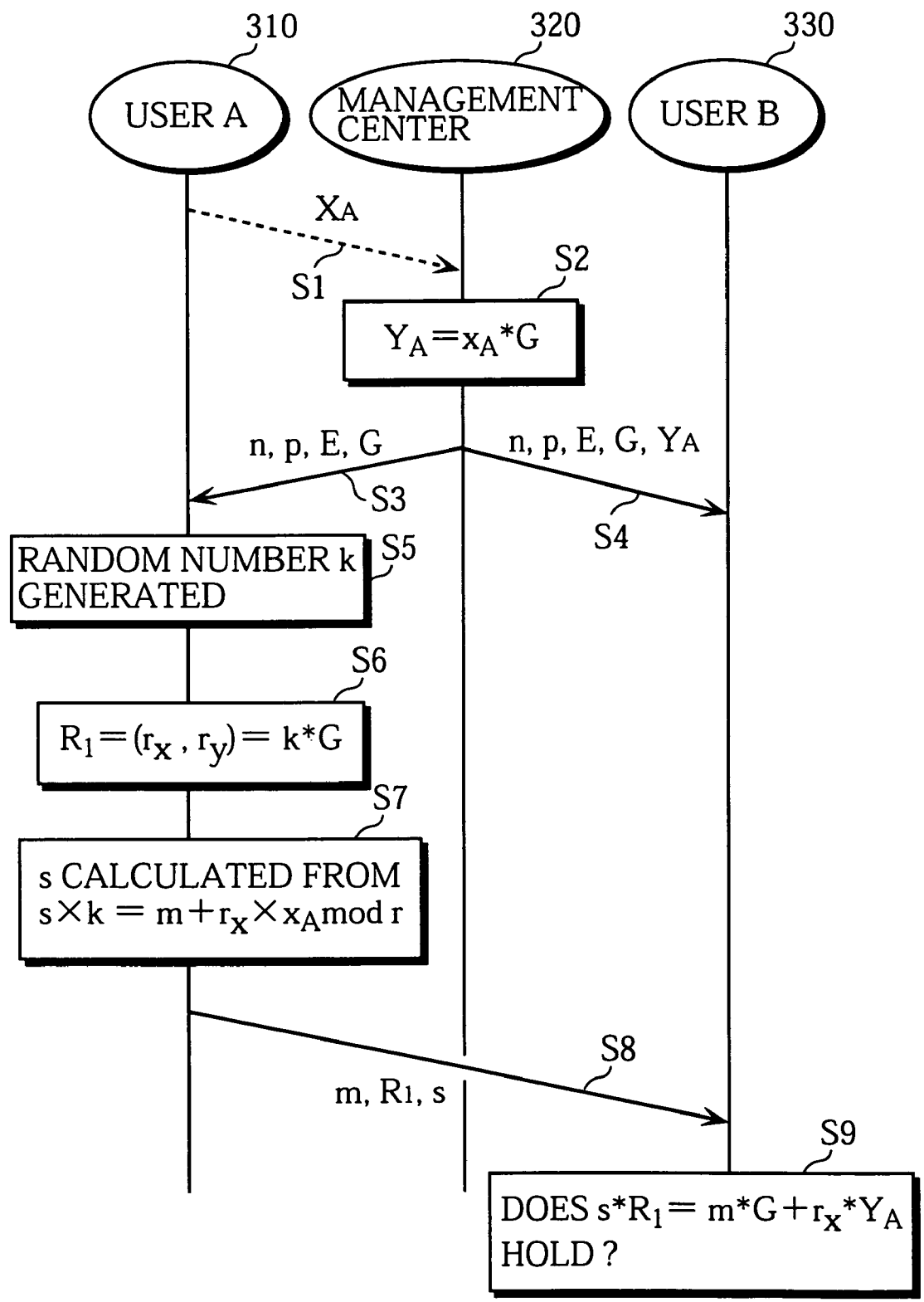
FIG. 9 is a sequential view showing the procedure of the conventional ElGamal digital signature scheme.
Figure 10:
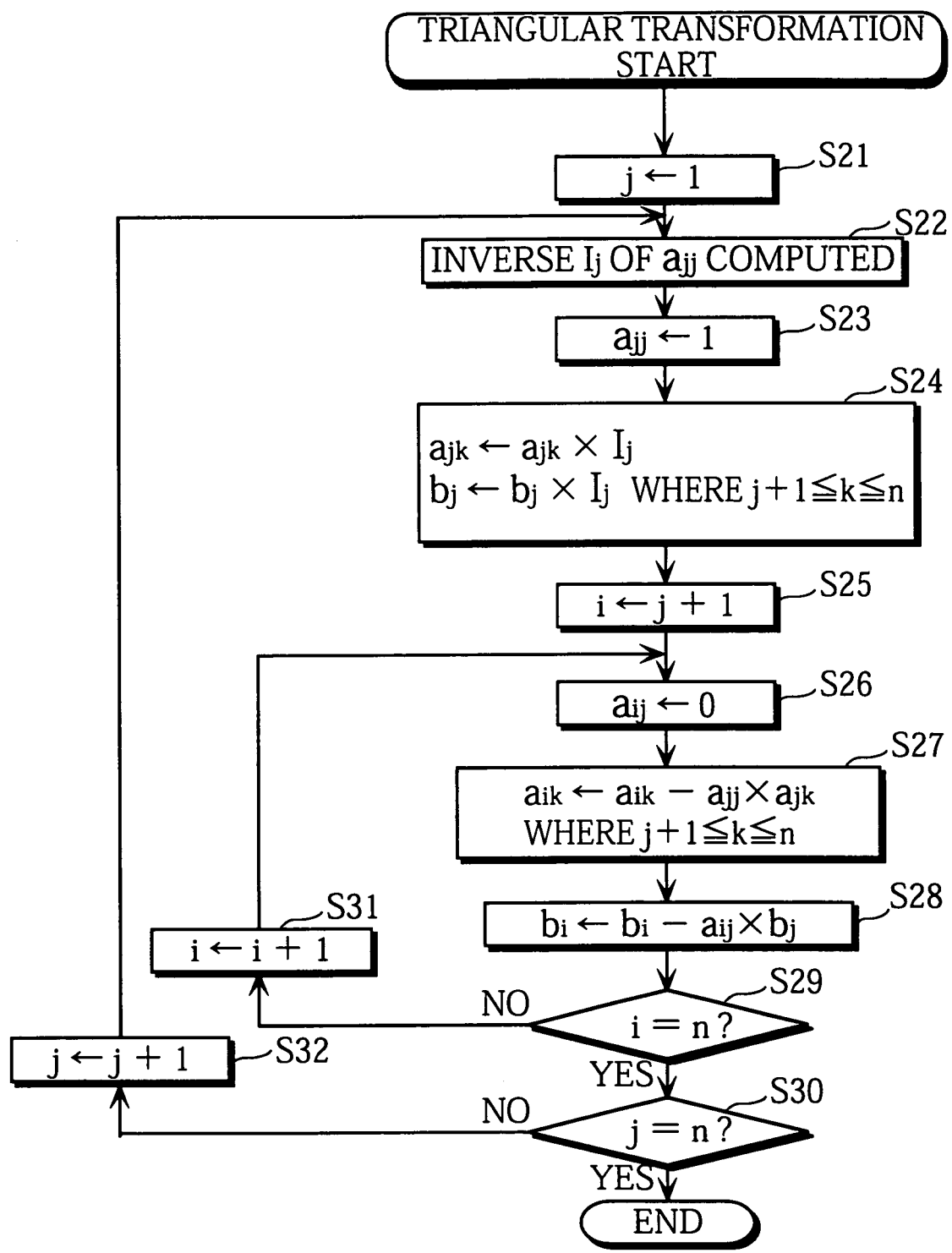
FIG. 10 is a flowchart showing the conventional triangular transformation of a coefficient matrix.

The operation of the equation transforming unit 102a is explained below with reference to FIG. 7. The flowchart in FIG. 7 includes steps S118a~S118c instead of step S118 in FIG. 3.

Figure 3:
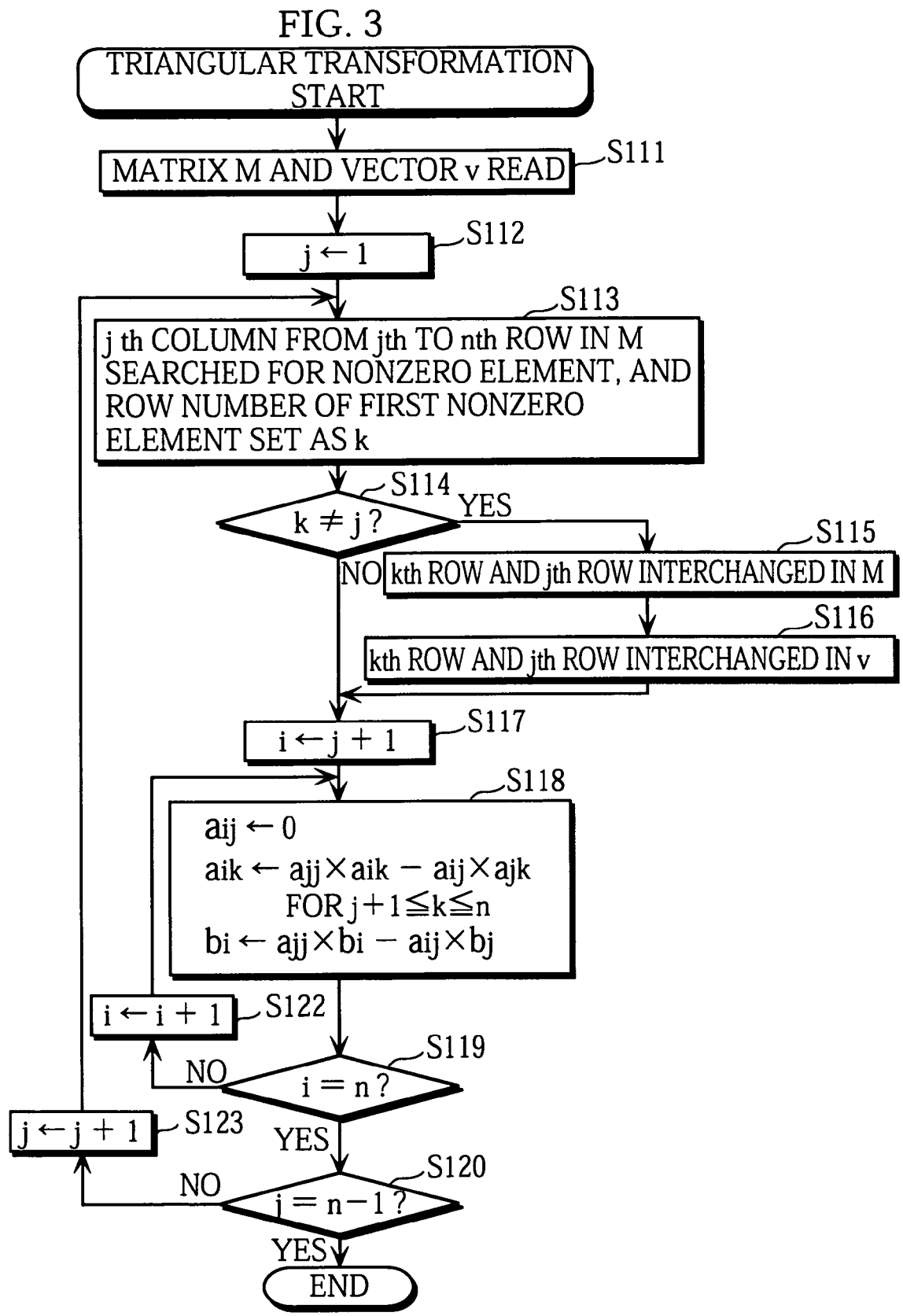
FIG. 3 is a flowchart showing the operation of triangular transforming a coefficient matrix of a system of equations by an equation transforming unit 102 in the inversion apparatus 100.

Since the other steps are the same as those in FIG. 3, the following explanation will focus on steps S118a~S118c.

In step S118a, the equation transforming unit 102a computes $$h_k = \prod_{m=j}^{n} a_{mj} \text{ (except } a_{kj})$$

for each k that satisfies $j \leq k \leq n$ (k=j, j+1, \ldots, n). In step S118b, the equation transforming unit 102a computes $w_k = h_j \times a_{jk}$ $e = h_j \times b_j$ for each k that satisfies $j+1 \leq k \leq n$ (k=j+1, j+2, \ldots, n). In step S118c, having set $a_{ij}=0$, the equation transforming unit 102a computes $a_{ik} = h_i \times a_{ik} - w_k$ $b_i = h_i \times b_i - e$ for each k that satisfies $j+1 \leq k \leq n$ (k=j+1, j+2, \ldots, n).

CONCRETE EXAMPLE

An example of the operation of the equation transforming unit 102a is shown below.

As with the prior art 3, a prime p=31, a generator polynomial $f(g)=g^{5-2}$, and an element $x=5\alpha^4+29\alpha^3+6\alpha^2 19\alpha 17$ of GF(q) are given. A system of equations to be solved is the same as that in the prior art 3, as shown in FIG. 8(a).

When j=1, the equation transforming unit 102a calculates $s_1 = a_{11} \times a_{21} = 17 \times 19 = 13 \mod 31$ $s_2 = s \times a_{31} = 13 \times 6 = 16 \mod 31$ $h_5 = s_2 \times a_{41} = 16 \times 29 = 30 \mod 31$ $h_4 = s_2 \times a_{51} = 16 \times 5 = 18 \mod 31$ $s_5 = a_{41} \times a_{51} = 29 \times 5 = 21 \mod 31$ $h_3 = s_1 \times s_5 = 13 \times 21 = 25 \mod 31$ $s_4 = a_{31} \times s_5 = 6 \times 21 = 2 \mod 31$ $h_2 = a_{11} \times s_4 = 17 \times 2 = 3 \mod 31$ $h_1 = a_{21} \times s_4 = 19 \times 2 = 7 \mod 31$ and then calculates $w_2 = h_1 \times a_{12} = 7 \times 10 = 8 \mod 31$ $w_3 = h_1 \times a_{13} = 7 \times 27 = 3 \mod 31$ $w_4 = h_1 \times a_{14} = 7 \times 12 = 22 \mod 31$ $w_5 = h_1 \times a_{15} = 7 \times 7 = 18 \mod 31$ $e = h_1 \times b_1 = 7 \times 1 = 7 \mod 31$ When i=2 (j=1), the equation transforming unit 102a calculates $a_{21} = 0$ $a_{22} = h_2 \times a_{22} - w_2 = 3 \times 17 - 8 = 12 \mod 31$ $a_{23} = h_2 \times a_{23} - w_3 = 3 \times 10 - 3 = 27 \mod 31$ $a_{24} = h_2 \times a_{24} - w_4 = 3 \times 27 - 22 = 28 \mod 31$ $a_{25} = h_2 \times a_{25} - w_5 = 3 \times 12 - 18 = 18 \mod 31$ $b_2 = h_2 \times b_2 - e = 3 \times 0 - 7 = 24 \mod 31$ According to this method, only one multiplication is needed to find $a_{ik}$ unlike the first embodiment which needs two multiplications, so that computational complexity is further reduced.

With the above computations, the system of equations is transformed as shown in FIG. 8(b), where the element in the first column and second row has become 0 in a coefficient matrix 511.

As a result of the transformation process for j=1, the system of equations has become as shown in FIG. 8(c), where the elements in the first column and third to fifth rows are 0 in a coefficient matrix 521.

Next, when j=2, the equation transforming unit 102a calculates $s_1 = a_{22} \times a_{32} = 12 \times 2 = 24 \mod 31$ $h_5 = s_1 \times a_{42} = 24 \times 7 = 13 \mod 31$ $h_4 = s_1 \times a_{52} = 24 \times 25 = 11 \mod 31$ $s_4 = a_{42} \times a_{52} = 7 \times 25 = 20 \bmod 31$ $h_3 = a_{22} \times s_4 = 12 \times 20 = 23 \bmod 31$ $h_2 = a_{32} \times s_4 = 2 \times 20 = 9 \bmod 31$ and then calculates $w_3 = h_2 \times a_{23} = 9 \times 27 = 26 \bmod 31$ $w_4 = h_2 \times a_{24} = 9 \times 28 = 4 \bmod 31$ $w_5 = h_2 \times a_{25} = 9 \times 18 = 7 \bmod 31$ $e = h_2 \times b_2 = 9 \times 24 = 30 \bmod 31$ As a result of the transformation process for j=2, the system of equations has become as shown in FIG. 8(*d*), where the elements in the second column and third to fifth rows are 0 in a coefficient matrix 531.

Next, when j=3, the equation transforming unit 102*a* calculates $h_5 = a_{33} \times a_{43} = 8 \times 14 = 19 \bmod 31$ $h_4 = a_{33} \times a_{53} = 8 \times 12 = 3 \bmod 31$ $h_3 = a_{43} \times a_{53} = 14 \times 12 = 13 \bmod 31$ and then calculates $w_4 = h_3 \times a_{34} = 13 \times 1 = 13 \bmod 31$ $w_5 = h_3 \times a_{35} = 13 \times 7 = 29 \bmod 31$ $e = h_3 \times b_3 = 13 \times 26 = 28 \bmod 31$ As a result of the transformation process for j=3, the system of equations has become as shown in FIG. 8(*e*), where the elements in the third column and fourth to fifth rows are 0 in a coefficient matrix 541.

Next, when j=4, the equation transforming unit 102*a* calculates $h_5 = a_{44} = 16 \bmod 31$ $h_4 = a_{54} = 14 \bmod 31$ and then calculates $w_5 = h_4 \times a_{45} = 14 \times 26 = 23 \bmod 31$ $e = h_4 \times b_4 = 14 \times 23 = 12 \bmod 31$ As a result of the transformation process for j=4, the system of equations has become as shown in FIG. 8(*f*), where the element in the fourth column and fifth row is 0 in a coefficient matrix 551.

Here, let C=A and D=B, and the diagonal elements are inverted by computing $s_1 = m_1 \times m_2 = 17 \times 12 = 18 \bmod 31$ $s_2 = s_1 \times m_3 = 18 \times 8 = 20 \bmod 31$ $t_5 = s_2 \times m_4 = 20 \times 16 = 10 \bmod 31$ $t_4 = s_2 \times m_5 = 20 \times 22 = 6 \bmod 31$ $s_5 = m_4 \times m_5 = 16 \times 22 = 11 \bmod 31$ $t_3 = s_1 \times s_5 = 18 \times 11 = 12 \bmod 31$ $s_4 = m_3 \times s_5 = 8 \times 11 = 26 \bmod 31$ $t_2 = m_1 \times s_4 = 17 \times 26 = 8 \bmod 31$ $t_1 = m_2 \times s_4 = 12 \times 26 = 2 \bmod 31$ $t = m_1 \times t_1 = 17 \times 2 = 3 \bmod 31$ $u = 1/t = 1/3 = 21 \bmod 31$ $I_1 = u \times t_1 = 21 \times 2 = 11 \bmod 31$ $I_2 = u \times t_2 = 21 \times 8 = 13 \bmod 31$ $I_3 = u \times t_3 = 21 \times 12 = 4 \bmod 31$ $I_4 = u \times t_4 = 21 \times 6 = 2 \bmod 31$ $I_5 = u \times t_5 = 21 \times 10 = 24 \bmod 31$ Notice that u=1/t=1/3=21 mod 31 is the only inverse operation here.

Lastly, the system of equations is solved as follows:

$$y_4 = I_5 \times d_5 = 24 \times 18 = 29 \bmod 31$$

$$y_3 = I_4 \times (d_4 - c_{45} \times y_4)$$
$$= 2 \times (23 - 26 \times 29) = 26 \bmod 31$$

$$y_2 = I_3 \times (d_3 - c_{34} \times y_3 - c_{35} \times y_4)$$
$$= 4 \times (26 - 1 \times 26 - 7 \times 29) = 25 \bmod 31$$

$$y_1 = I_2 \times (d_2 - c_{23} \times y_2 - c_{24} \times y_3 - c_{25} \times y_4)$$
$$= 13 \times (24 - 27 \times 25 - 28 \times 26 - 18 \times 29)$$
$$= 25 \bmod 31$$

$$y_0 = I_1 \times (d_1 - c_{12} \times y_1 - c_{13} \times y_2 - c_{14} \times y_3 - c_{15} \times y_4)$$
$$= 11 \times (1 - 10 \times 25 - 27 \times 25 - 12 \times 26 - 7 \times 29)$$
$$= 12 \bmod 31$$

(Computational Complexity of the Equation Transforming Unit 102*a*)

Computational complexity of the equation transforming unit 102*a* for one value of counter j (steps S113~S119 in FIG. 7) is measured below.

In step S118*a*, (3×(n−j+1)−6) multiplications are needed to find $h_k$ (k=j,j+1, . . . ,n), so that computational complexity is (3×(n−j+1)−6)Mul.

In step S118*b*, (n−(j+1)+1+1) multiplications are needed to find $w_k$ (k=j+1,j+2, . . . ,n) and e, so that computational complexity is (n−j+1)Mul.

In step S118*c*, for one value of counter i, computational complexity is as follows.

(a) To compute $a_{ik} = h_i \times a_{ik} - w_k$ for j+1≦k≦n (k=j+1,j+2, . . . ,n), one multiplication is repeated (n−(j+1)+1)=(n−j) times, so that computational complexity is (n−j) Mul.

(b) To compute $b_i = h_i \times b_i - e$, one multiplication is performed, so that computational complexity is 1Mul.

Since counter i changes from j+1 to n, the computational complexity of step S118*c* for all values of counter i is (n−j+1)Mul×(n−(j+1)+1)=(n−j)×(n−j+1))Mul Accordingly, the total computational complexity of steps S118*a*~S118*c* for one value of counter j is $$((3\times(n-j+1)-6)+(n-j+1)+(n-j)(n-j+1))\mathrm{Mu}1 =$$
$$(4\times(n-j+1)-6+(n-j)(n-j+1))\mathrm{Mu}1 =$$
$$((n-j+4)(n-j+1)-6)\mathrm{Mu}1$$

Since counter j changes from 1 to n−1, the total computational complexity of the equation transforming unit 102a is $$\sum_{j=1}^{n-1}((n-j+4)(n-j+1)-6)\mathrm{Mu}1 =$$

$$1\mathrm{Mu}1\times\sum_{j=1}^{n-1}((j+4)(j+1)-6) = 1\mathrm{Mu}1\times\left(\sum_{j=1}^{n-1}j^2+5\times\sum_{j=1}^{n-1}j-2\times\sum_{j=1}^{n-1}1\right) =$$

$$1\mathrm{Mu}1\times(1/6\times n(n-1)(2n-1)+5/2\times(n-1)-2(n-1)) =$$

$$1\mathrm{Mu}1\times(1/6\times n(n-1)(2n-1+15)-2(n-1)) =$$

$$1\mathrm{Mu}1\times(1/6\times n(n-1)(2n+14)-2(n-1)) =$$

$$1\mathrm{Mu}1\times(1/3\times n(n-1)(n+7)-2(n-1)) = 1\mathrm{Mu}1\times(1/3\times(n-1)$$
$$(n^2+7n-6)) = (1/3\times n^3+2n^2-13/3\times n+2)\mathrm{Mu}1$$

Therefore, the overall computational complexity of the equation solving unit 202 equipped with the equation transforming unit 102a is given by $$((1/3\times n^3+2n^2-13/3\times n+2)+(4n-5)+1/2\times n(n+1))\mathit{Mul}+$$
$$1\mathit{Inv}=(1/3\times n+5/2\times n^2+1/6\times n-3)\mathit{Mul}+1\mathit{Inv}$$

Supposing 1Inv=40Mul when n=5, the overall computational complexity can be estimated at 142Mul.

2.2. Other Modifications (1) In a communication system, such as a cryptographic communication system, a digital signature communication system, or an error correction communication system, whose security is based on the discrete logarithm problem on an elliptic curve E over an extension field GF(q) of a finite field GF(p) where p is a prime, $q=p^n$, n is a positive integer, and G is a base point of E, the equation solving unit and the inversion apparatus of the invention may be used to calculate inverses of elements in the extension field GF(q). One example of cryptographic communication systems is an e-mail system on the Internet whereby messages are encrypted before transmission. One example of digital signature communication systems is an electronic banking system. One example of error correction communication systems is an e-mail system whereby, in such cases that part of transmitted message is dropped due to deterioration in quality of a communication line, the error is detected and corrected.

Also, the equation solving unit and the inversion apparatus of the invention may be used for encryption in a recording apparatus that encrypts copyrighted digital content using the elliptic curve discrete logarithm problem as the basis for security and records the encrypted digital content into a record medium such as a DVD or a semiconductor memory, or decryption in a reproducing apparatus that decrypts the encrypted digital content stored in the record medium to reproduce the digital content.

By applying the invention to these systems, the inverses of extension field elements can be computed with small computational complexity.

In such applications, the equation solving unit and the inversion apparatus of the invention can be implemented, for example, as firmware stored in a mobile phone or a circuit board equipped in a personal computer.

(2) Though the generator polynomial of the form $g^n-\beta$ has been used in the above embodiment, for an ordinary generator polynomial of the nth degree such as $$f(g)=\beta_n g^n+\beta_{n-1}g^{n-1}+\ldots+\beta_2 g^2+\beta_1 g+\beta$$

the inverse I of an element x in an extension field GF(q) ($q=p^n$, n a positive integer) of a predetermined finite field GF(p) can be calculated in a similar manner.

Let an ordinary polynomial f(g) of the nth degree be the generator polynomial and a be the root of f(g). For an element $x=x_0+x_1\alpha+\ldots+x_{n-1}\alpha^{n-1}$ in the extension field GF(q), when the coefficient of $\alpha^{i-1}$ in $(x\times\alpha^{j-1}\bmod f(\alpha))$ is denoted by $a_{ij}$, a system of linear equations in n unknowns can be written as $$a_{11}y_0+a_{12}y_1+a_{13}y_2+\cdots+a_{1n}y_{n-1}=1$$
$$a_{21}y_0+a_{22}y_1+a_{23}y_2+\cdots+a_{2n}y_{n-1}=0$$
$$\vdots$$
$$a_{n1}y_0+a_{n2}y_1+a_{n3}y_2+\cdots+a_{nn}y_{n-1}=0$$

The reason that the system of linear equations in n unknowns can be written like this is given below.

The equations $$x\times I=x\times y_0+x+y_1\times\alpha+\cdots+x\times y_{n-1}\alpha^{n-1}$$
$$=1\bmod f(\alpha)$$

and $$x\times y_0+x\times y_1\times\alpha+\ldots+x\times y_{n-1}\alpha^{n-1}=x\times y_0+(x\times\alpha\bmod f(\alpha))\times y_1+\ldots+(x\times\alpha^{n-1}\bmod f(\alpha))\times y_{n-1}$$

hold. The coefficient of $\alpha^{i-1}$ is given by $$a_{i1}\times y_0+a_{i2}\times y_1+\ldots a_{in}\times y_{n-1}$$

The coefficients of $\alpha^{i-1}$ (i>2) are all 0 and the coefficient of $a^0$ (i=1) is 1. Hence the above system of linear equations in n unknowns is derived.

(3) The invention may be the equation solving method and the inversion method used in the above described equation solving unit and inversion apparatus. The invention may also be computer programs for implementing these methods, or digital signals for executing the computer programs.

Also, the invention may be computer-readable storage mediums, such as floppy disks, hard disks, CD-ROMs, MOs, DVDs, DVD-ROMs, DVD-RAMs, or semiconductor memories, that store the computer programs or the digital signals. Likewise, the invention may be the computer programs or digital signals stored in such storage mediums.

Also, the invention may be realized by transferring the computer programs or the digital signals on a carrier wave via a network such as a telecommunication network, a radio or cable communication network, or the Internet.

Further, the invention may be realized by distributing the computer programs or the digital signals stored in the storage mediums or transferring the computer programs or the digital signals on the carrier wave via the network so that they can be used in other computer systems.

(4) Various combinations of the embodiment and the modifications stated above are possible.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An apparatus for use in one of: secret communications by encryption and decryption; digital signature generation and verification; and data conversion including encoding and decoding of data, the apparatus comprising a machine readable memory that provides instructions for solving a system of linear equations Ax=b in n unknowns on a finite field GF(p), where p is a prime, n is a positive integer, A is a coefficient matrix consisting of elements of n rows and n columns, x is a vector of unknowns consisting of n elements, and b is a constant vector consisting of n elements, which when executed by a machine, cause said machine to perform operations comprising:

reading a stored coefficient matrix A and a stored constant vector b, and triangular transforming the read coefficient matrix A and constant vector b to generate a coefficient matrix C and a constant vector d for a system of linear equations Cx=d in n unknowns that is equivalent to the system of linear equations Ax=b, the coefficient matrix C consisting of elements of n rows and n columns and the constant vector d consisting of n elements;

calculating inverses of diagonal elements of the generated coefficient matrix C on the finite field GF(p); and solving the system of linear equations Cx=d using the generated coefficient matrix C, the generated constant vector d, and the calculated inverses of the diagonal elements of the generated coefficient matrix C, to thereby solve the system of linear equations Ax=b of the read coefficient matrix A and the read constant vector b; and performing one of: secret communication by encryption and decryption; digital signature generation and verification; and data conversion including encoding and decoding of data, by using the solution of the system of linear equations Ax=b; wherein the coefficient matrix A is triangular transformed into the coefficient matrix C of upper triangular form without a division on the finite field GF(p) being performed;

generating the coefficient matrix C and the constant vector d of the system of linear equations Cx=d from the coefficient matrix A and the constant vector b of the system of linear equations Ax=b includes one or more successive transformation processes;

the system of linear equations Ax=b is subjected to the first transformation process and the system of linear equations Cx=d is generated as a result of the last transformation process;

in each transformation process, a coefficient matrix and a constant vector of a system of linear equations in n unknowns are transformed into a coefficient matrix and a constant vector of a system of linear equations in n unknowns that is equivalent to the system of linear equations before the transformation;

in each transformation process, one pivotal equation which is a linear equation in n unknowns serving as a pivot for the transformation and one or more object equations which are linear equations in n unknowns to be transformed are chosen from the system of linear equations in n unknowns that is subjected to the transformation;

each transformation process has a same number of transformation subprocesses as the one or more object equations, each for transforming a separate one of the one or more object equations into an equation equivalent to the object equation; and in each transformation subprocess, (a) each of the coefficients and a constant in the pivotal equation is multiplied by a nonzero coefficient chosen from the object equation, and values generated as a result of the multiplications are set into a second coefficient group, (b) each of coefficients and a constant in the object equation is multiplied by a nonzero coefficient chosen from the pivotal equation, and values generated as a result of the multiplications are set into a first coefficient group, and (c) the values in the second coefficient group are subtracted respectively from the values in the first coefficient group, and differences generated as a result of the subtractions are respectively set as coefficients and a constant in the equation equivalent to the object equation.

2. The apparatus of claim 1, wherein when the diagonal elements of the coefficient matrix C are denoted by $m_i$ (i=1,2, . . . , n) and the inverses of the diagonal elements $m_i$ (i=1,2, . . . ,n) in the finite field GF(p) are denoted by $I_i$ (i=1,2, . . . n), calculating inverses of diagonal elements of the coefficient matrix C includes (a) computing values t and $t_i$ where $$t_i = \prod_{k=1}^{n} m_k (\text{except } m_i) \bmod p \ (i = 1, 2, \ldots, n)$$

and $$t = \prod_{k=1}^{n} m_k \bmod p$$

(b) computing u where $u = 1/t \bmod p$ and (c) computing values $I_i$ where $I_i = u \times t_i \bmod p$ (i=1,2, . . . ,n)

to find the inverses $I_i$ (i=1,2, . . . ,n).

3. The apparatus of claim 2, wherein computing the values t and $t_i$ includes calculating $$s_1 = m_1 \times m_2 \bmod p$$

$$s_2 = s_1 \times m_3 \bmod p$$

$$s_{n-3} = s_{n-4} \times m_{n-2} \bmod p$$

in the stated order, then calculating $$t_n = s_{n-3} \times m_{n-1} \mod p$$
$$t_{n-1} = s_{n-3} \times m_n \mod p$$
$$s_n = m_{n-1} \times m_n \mod p$$
$$t_{n-2} = s_{n-4} \times s_n \mod p$$
$$s_{n-1} = m_{n-2} \times s_n \mod p$$
$$t_{n-3} = s_{n-5} \times s_{n-1} \mod p$$
$$s_{n-2} = m_{n-3} \times s_{n-1} \mod p$$
$$t_{n-4} = s_{n-6} \times s_{n-2} \mod p$$
$$s_5 = m_4 \times s_6 \mod p$$
$$t_3 = s_1 \times s_5 \mod p$$
$$s_4 = m_3 \times s_5 \mod p$$
$$t_2 = m_1 \times s_4 \mod p$$
$$t_i = m_2 \times s_4 \mod p$$

in the stated order, and lastly calculating $$t = t_j \times m_j$$

for a value j chosen from a set of positive integers $\{1, 2, \ldots, n\}$.

4. An apparatus for use in one of: secret communications by encryption and decryption; digital signature generation and verification; and data conversion including encoding and decoding of data, the apparatus comprising a machine readable memory that provides instructions for solving a system of linear equations Ax=b in n unknowns on a finite field GF(p), where p is a prime, n is a positive integer, A is a coefficient matrix consisting of elements of n rows and n columns, x is a vector of unknowns consisting of n elements, and b is a constant vector consisting of n elements, which when executed by a machine, cause said machine to perform operations comprising:

reading a stored coefficient matrix A and a stored constant vector b, and triangular transforming the read coefficient matrix A and constant vector b to generate a coefficient matrix C and a constant vector d for a system of linear equations Cx=d in n unknowns that is equivalent to the system of linear equations Ax=b, the coefficient matrix C consisting of elements of n rows and n columns and the constant vector d consisting of n elements;

calculating inverses of diagonal elements of the generated coefficient matrix C on the finite field GF(p); and solving the system of linear equations Cx=d using the generated coefficient matrix C, the generated constant vector d, and the calculated inverses of the diagonal elements of the generated coefficient matrix C, to thereby solve the system of linear equations Ax=b of the read coefficient matrix A and the read constant vector b; and performing one of: secret communication by encryption and decryption; digital signature generation and verification; and data conversion including encoding and decoding of data, by using the solution of the system of linear equations Ax=b; wherein the coefficient matrix A is triangular transformed into the coefficient matrix C of upper triangular form without a division on the finite field GF(p) being performed;

generating the coefficient matrix C and the constant vector d of the system of linear equations Cx=d from the coefficient matrix A and the constant vector b of the system of linear equations Ax=b includes one or more successive transformation processes;

the system of linear equations Ax=b is subjected to the first transformation process and the system of linear equations Cx=d is generated as a result of the last transformation process;

in each transformation process, a coefficient matrix and a constant vector of a system of linear equations in n unknowns are transformed into a coefficient matrix and a constant vector of a system of linear equations in n unknowns that is equivalent to the system of linear equations before the transformation;

in each transformation process, one pivotal equation which is a linear equation in n unknowns serving as a pivot for the transformation and one or more object equations which are linear equations in n unknowns to be transformed are chosen from the system of linear equations in n unknowns that is subjected to the transformation;

each transformation process has a coefficient group calculation process and a same number of transformation subprocesses as the one or more object equations, the transformation subprocesses being performed following the coefficient group calculation process and being each for transforming a separate one of the one or more object equations;

in the coefficient group calculation process,
(a) a nonzero coefficient is chosen from each of the pivotal equation and the one or more object equations, a product is calculated for each of the pivotal equation and the one or more object equations by multiplying together all chosen nonzero coefficients except a nonzero coefficient chosen from the equation, and products calculated respectively for the pivotal equation and the one or more object equations are set into a first coefficient group, and
(b) each of coefficients and a constant in the pivotal equation except a nonzero coefficient chosen from the pivotal equation in the coefficient group calculation process is multiplied by a product in the first coefficient group calculated for the pivotal equation, and values generated as a result of the multiplications are set into a second coefficient group; and in each transformation subprocess for transforming a separate one of the one or more object equations,
(a) a nonzero coefficient chosen from the object equation in the coefficient group calculation process is changed to 0 as a new coefficient,
(b) each of coefficients in the object equation except the nonzero coefficient chosen from the object equation is multiplied by a product in the first coefficient group calculated for the object equations, values in the second coefficient group calculated from the coefficients in the pivotal equation are subtracted respectively from values generated as a result of the multiplications on the coefficients in the object equation to generate differences, and the coefficients in the object equation are changed respectively to the differences as new coefficients, and
(c) a constant in the object equation is multiplied by the product calculated for the object equations, a value in the second coefficient group calculated from the constant in the pivotal equation is subtracted from a value generated as a result of the multiplication on the constant in the object equation to generate a difference, and the constant in the object equation is changed to the difference as a new constant.

5. The apparatus of claim 1,
wherein when the diagonal elements of the coefficient matrix C are denoted by $m_i$ (i=1,2, ... ,n) and the inverses of the diagonal elements $m_i$ (i=1,2, ... ,n) in the finite field GF(p) are denoted by $I_i$ (i=1,2, ... ,n), calculating inverses of diagonal elements of the coefficient matrix C includes (a) a multiplying unit for computing values t and $t_i$ where $$t_i = \prod_{k=1}^{n} m_k \text{ (except } m_i\text{) mod } p \ (i=1, 2, \ldots, n)$$

and $$t = \prod_{k=1}^{n} m_k \text{ mod } p$$

(b) computing a value u where $u = 1/t \bmod p$ and
(c) computing values $I_i$ where $I_i = u \times t_i \bmod p$ (i=1,2, ... ,n)

to find the inverses $I_i$ (i=1,2, ... ,n).

6. The apparatus of claim 5,
wherein computing values t and $t_i$ includes calculating $s_1 = m_1 \times m_2 \bmod p$ $s_2 = s_1 \times m_3 \bmod p$ $s_{n-3} = s_{n-4} \times m_{n-2} \bmod p$ in the stated order, then calculating $t_n = s_{n-3} \times m_{n-1} \bmod p$ $t_{n-1} = s_{n-3} \times m_n \bmod p$ $s_n = m_{n-1} \times m_n \bmod p$ $t_{n-2} = s_{n-4} \times s_n \bmod p$ $s_{n-1} = m_{n-2} \times s_n \bmod p$ $t_{n-3} = s_{n-5} \times s_{n-1} \bmod p$ $s_{n-2} = m_{n-3} \times s_{n-1} \bmod p$ $t_{n-4} = s_{n-6} \times s_{n-2} \bmod p$ $s_5 = m_4 \times s_6 \bmod p$ $t_3 = s_1 \times s_5 \bmod p$ $s_4 = m_3 \times s_5 \bmod p$ $t_2 = m_1 \times s_4 \bmod p$ $t_1 = m_2 \times s_4 \bmod p$ in the stated order, and lastly calculating $t = t_j \times m_j$ for a value j chosen from a set of positive integers $\{1,2, \ldots ,n\}$.

7. An apparatus for computing an inverse I of an element y in GF(q) which is an extension field of a finite field GF(p), where p is a prime, $q=p_n$, and n is a positive integer, the apparatus comprising:

equation generating means for generating a coefficient matrix A and a constant vector b for a system of linear equations Ax=b in n unknowns, using the element y and all coefficients of a generator polynomial of GF(q) whose root is $\alpha$, equation solving means for finding solutions $x_k$ (k=0, 1, 2, ... , n−1) of the system of linear equations Ax=b; and inverse computing means for computing the inverse I, $I = x_0 + x_1 \alpha + \ldots + x_{n-1} \alpha^{n-1}$, using the root $\alpha$ and the solutions $x_k$ (k=0, 1, 2, ... , n−1) found by the equation solving means; wherein the equation solving means includes a machine readable memory that provides instructions for solving the system of linear equations Ax=b where A is a coefficient matrix consisting of elements of n rows and n columns, x is a vector of unknowns consisting of n elements, and b is a constant vector consisting of n elements, which when executed by a machine, cause said machine to perform operations comprising reading a stored coefficient matrix A and a stored constant vector b, triangular transforming the read coefficient matrix A and constant vector b to generate a coefficient matrix C and a constant vector d for a system of linear equations Cx=d in n unknowns that is equivalent to the system of linear equations Ax=b, the coefficient matrix C consisting of elements of n rows and n columns and the constant vector d consisting of n elements, wherein the coefficient matrix A is triangular transformed into the coefficient matrix C of upper triangular form without a division on the finite field GF(y) being performed, calculating inverses of diagonal elements of the generated coefficient matrix C on the finite field GF(p), and solving the system of linear equations Cx=d using the generated coefficient matrix C, the generated constant vector d, and the calculated inverses of the diagonal elements of the generated coefficient matrix C, to thereby solve the system of linear equations Ax=b of the read coefficient matrix A and the read constant vector b.

8. The apparatus of claim 1, the apparatus computing an inverse I of an element y in GF(q) which is an extension field of a finite field GF(p), where $q=p^n$, the apparatus further comprising:

equation generating means for generating the coefficient matrix A and the constant vector b using the element y and all coefficients of a generator polynomial of GF(q) whose root is $\alpha$, equation solving means for finding solutions $x_k$ (k=0, 1, 2, ... , n−1) of the system of linear equations Ax=b, the equation solving means including the the machine readable memory; and inverse computing means for computing the inverse I, $I = x_0 + x_1 \alpha + \ldots + x_{n-1} \alpha^{n-1}$, using the root $\alpha$ and the solutions $x_k$ (k=0, 1, 2, ... , n−1) found by the equation solving means; and means for performing one of: secret communication by encryption and decryption; digital signature generation and verification; and data conversion including encoding and decoding of data, by using the computed inverse I.

9. The apparatus of claim 2, the apparatus computing an inverse I of an element y in GF(q) which is an extension field of a finite field GF(p), where, the apparatus further comprising:
- equation generating means for generating the coefficient matrix A and the constant vector b, using the element y and all coefficients of a generator polynomial of GF(q) whose root is α;
- equation solving means for finding solutions $x_k$ (k=0, 1, 2, . . . , n−1) of the system of linear equations Ax=b, the equation solving means including the-machine readable memory; and
- inverse computing means for computing the inverse I, $I=x_0+x_1\alpha+ \ldots +x_{n-1}\alpha^{n-1}$, using the root α and the solutions $x_k$ (k=0, 1, 2, . . . , n−1) found by the equation solving means; and
- means for performing one of: secret communication by encryption and decryption; digital signature generation and verification; and data conversion including encoding and decoding of data, by using the computed inverse I.

10. The apparatus of claim 3 the apparatus computing an inverse I of an element y in GF(q) which is an extension field of a finite field GF(p), where p, $q=p^n$, the apparatus further comprising:
- equation generating means for generating the coefficient matrix A and the constant vector b using the element y and all coefficients of a generator polynomial of GF(q) whose root is α,
- equation solving means for finding solutions $x_k$ (k=0, 1, 2, . . . , n−1) of the system of linear equations Ax=b, the equation solving means including the machine readable memory;
- inverse computing means for computing the inverse I, $I=x_0+x_1\alpha+ \ldots +x_{n-1}\alpha^{n-1}$, using the root α and the solutions $x_k$ (k=0, 1, 2, . . . , n−1) found by the equation solving means; and
- means for performing one of: secret communication by encryption and decryption; digital signature generation and verification; and data conversion including encoding and decoding of data, by using the computed inverse I.

11. The apparatus of claim 4, the apparatus computing an inverse I of an element y in GF(q) which is an extension field of a finite field GF(p), where $q=p^n$, the apparatus further comprising:
- equation generating means for generating the coefficient matrix A and the constant vector b using the element y and all coefficients of a generator polynomial of GF(q) whose root is α,
- equation solving means for finding solutions $x_k$ (k=0, 1, 2, . . . n−1) of the system of linear equations Ax=b, the equation solving means including the machine readable memory; and
- inverse computing means for computing the inverse I, $I=x_0+x_1\alpha+ \ldots +x_{n-1}\alpha^{n-1}$, using the root α and the solutions $x_k$ (k=0, 1, 2, . . . , n−1) found by the equation solving means; and
- means for performing one of: secret communication by encryption and decryption; digital signature generation and verification; and data conversion including encoding and decoding of data, by using the computed inverse I.

12. The apparatus of claim 5, the apparatus computing an inverse I of an element y in GF(q) which is an extension field of a finite field GF(p), where $q=p^n$, the apparatus comprising:
- equation generating means for generating the coefficient matrix A and the constant vector b, using the element y and all coefficients of a generator polynomial of GF(q) whose root is α;
- equation solving means for finding solutions $x_k$ (k=0, 1, 2, . . . , n−1) of the system of linear equations Ax=b, the equation solving means including the machine readable memory; and
- inverse computing means for computing the inverse I, $I=x_0+x_1\alpha+ \ldots +x_{n-1}\alpha^{n-1}$, using the root α and the solutions $x_k$ (k=0, 1, 2, . . . , n−1) found by the equation solving means; and
- means for performing one of: secret communication by encryption and decryption; digital signature generation and verification; and data conversion including encoding and decoding of data, by using the computed inverse I.

13. The apparatus of claim 6, the apparatus computing an inverse I of an element y in GF(q) which is an extension field of a finite field GF(p), where $p=p^n$ the apparatus comprising:
- equation generating means for generating the coefficient matrix A and the constant vector b using the element y and all coefficients of a generator polynomial of GF(q) whose root is α;
- equation solving means for finding solutions $x_k$ (k=0, 1, 2 . . . , n−1) of the system of linear equations Ax=b, the equation solving means including the machine readable memory; and
- inverse computing means for computing the inverse I, $I=x_0+x_1\alpha+ \ldots +x_{n-1}\alpha^{n-1}$, using the root α and the solutions $x_k$ (k=0, 1, 2, . . . , n−1) found by the equation solving means; and
- means for performing one of: secret communication by encryption and decryption; digital signature generation and verification; and data conversion including encoding and decoding of data, by using the computed inverse I.

14. A record medium reproducing apparatus for computing, when copyrighted digital content has been encrypted using a discrete logarithm problem on an elliptic curve E over GF(q) as a basis for security and recorded on a record medium, an inverse I of an element y in GF(q) to decrypt the encrypted digital content recorded on the record medium, where GF(q) is an extension field of a finite field GF(p), p is a prime, $q=p^n$, n is a positive integer, and G is a base point of the elliptic curve E, the record medium reproducing apparatus comprising:
- equation generating means for generating a coefficient matrix A and a constant vector b for a system of linear equations Ax=b in n unknowns, using the element y and all coefficients of a generator polynomial of GF(q) whose root is α;
- equation solving means for finding solutions $x_k$ (k=0, 1, 2, . . . , n−1) of the system of linear equations Ax=b and
- inverse computing means for computing the inverse I, $I=x_0+x_1\alpha+ \ldots +x_{n-1}\alpha^{n-1}$, using the root α and the solutions $x_k$ (k=0, 1, 2, . . . , n−1) found by the equation solving means; and
- means for using I to decrypt the encrypted digital content recorded on the record medium; wherein the equation solving means includes a machine readable memory that provides instructions for solving the system of linear equations Ax=b where A is a coefficient matrix consisting of elements of n rows and n columns, x is a vector of unknowns consisting of n elements, and b is a constant vector consisting of n elements, which when executed by a machine cause said machine to perform operations comprising reading a stored coefficient matrix A and a stored constant vector b, triangular transforming the read coefficient matrix A and constant vector b to generate a coefficient matrix C and a constant vector d for a system of linear equations Cx=d in n unknowns that is equivalent to the system of linear equations Ax=b, the coefficient matrix C consisting of elements of n rows and n columns and the constant vector d consisting of n elements, wherein the coefficient matrix A is triangular transformed into the coefficient matrix C of upper triangular form without a division on the finite field GF(p) being performed, calculating inverses of diagonal elements of the generated coefficient matrix C on the finite field GF(p), and solving the system of linear equations Cx=d using the generated coefficient matrix C, the generated constant vector d, and the calculated inverses of the diagonal elements of the generated coefficient matrix C, to thereby solve the system of linear equations Ax=b of the read coefficient matrix A and the read constant vector b.

15. The apparatus of claim 1 wherein the apparatus is a record medium reproducing apparatus for computing, when copyrighted digital content has been encrypted using a discrete logarithm problem on an elliptic curve E over GF(q) as a basis for security and recorded on a record medium, an inverse I of an element y in GF(q) to decrypt the encrypted digital content recorded on the record medium, where GF(q) is an extension field of the finite field GF(p), $q=p^n$, and G is a base point of the elliptic curve E, the record medium reproducing apparatus further comprising:

equation generating means for generating the coefficient matrix A and the constant vector b, using the element y and all coefficients of a generator polynomial of GF(q) whose root is $\alpha$;

equation solving means for finding solutions $x_k$ (k=0, 1, 2, ..., n−1) of the system of linear equations Ax=b, the equation solving means including the-machine readable memory; and inverse computing means for computing the inverse I, $I=x_0+x_1\alpha+ \ldots +x_{n-1}\alpha^{n-1}$, using the root $\alpha$ and the solutions $x_k$ (k=0, 1, 2, ..., n−1) found by the equation solving means; and means for using I to decrypt the encrypted digital content recorded on the record medium.

16. The apparatus of claim 2 wherein the apparatus is a record medium reproducing apparatus for computing, when copyrighted digital content has been encrypted using a discrete logarithm problem on an elliptic curve E over GF(q) as a basis for security and recorded on a record medium, an inverse I of an element y in GF(q) to decrypt the encrypted digital content recorded on the record medium, where GF(q) is an extension field of the finite field GF(p), $q=p^n$, and G is a base point of the elliptic curve E, the record medium reproducing apparatus further comprising:

equation generating means for generating the coefficient matrix A and the constant vector b using the element y and all coefficients of a generator polynomial of GF(q) whose root is A, equation solving means for finding solutions $x_k$ (k=0, 1, 2, ..., n−1) of the system of linear equations Ax=b, the equation solving means including the machine readable memory; and inverse computing means for computing the inverse I, $I=x_0+x_1\alpha+ \ldots +x_{n-1}\alpha^{n-1}$, using the root $\alpha$ and the solutions $x_k$ (k=0, 1, 2 ... n−1) found by the equation solving means; and means for using I to decrypt the encrypted digital content recorded on the record medium.

17. The apparatus of claim 3, wherein the apparatus is a record medium reproducing apparatus for computing, when copyrighted digital content has been encrypted using a discrete logarithm problem on an elliptic curve E over GF(q) as a basis for security and recorded on a record medium, an inverse I of an element y in GF(q) to decrypt the encrypted digital content recorded on the record medium, where GF(q) is an extension field of the finite field GF(p), $q=p^n$, and G is a base point of the elliptic curve E, the record medium reproducing apparatus further comprising:

equation generating means for generating the coefficient matrix A and the constant vector b using the element y and all coefficients of a generator polynomial of GF(q) whose root is $\alpha$;

equation solving means for finding solutions $x_k$ (k=0, 1, 2, ..., n−1) of the system of linear equations Ax=b, the equation solving means including the machine readable memory; and inverse computing means for computing the inverse I, $I=x_0+x_1\alpha+ \ldots +x_{n-1}\alpha^{n-1}$, using the root $\alpha$ and the solutions $x_k$ (k=0, 1, 2, ..., n−1) found by the equation solving means; and means for using I to decrypt the encrypted digital content recorded on the record medium.

18. The apparatus of claim 4, wherein the apparatus is a record medium reproducing apparatus for computing, when copyrighted digital content has been encrypted using a discrete logarithm problem on an elliptic curve E over GF(q) as a basis for security and recorded on a record medium, an inverse I of an element y in GF(q) to decrypt the encrypted digital content recorded on the record medium, where GF(q) is an extension field of the finite field GF(p), $q=p^n$, and G is a base point of the elliptic curve E, the record medium reproducing apparatus further comprising:

equation generating means for generating the coefficient matrix A and the constant vector b using the element y and all coefficients of a generator polynomial of GF(q) whose root is $\alpha$;

equation solving means for finding solutions $x_k$ (k=0, 1, 2, ..., n−1) of the system of linear equations Ax=b, the equation solving means including the machine readable memory; and inverse computing means for computing the inverse I, $I=x_0+x_1\alpha+ \ldots +x_{n-1}\alpha^{n-1}$, using the root $\alpha$ and the solutions $x_k$ (k=0, 1, 2, ..., n−1) found by the equation solving means; and means for using I to decrypt the encrypted digital content recorded on the record medium.

19. The apparatus of claim 5, wherein the apparatus is a record medium reproducing apparatus for computing, when copyrighted digital content has been encrypted using a discrete logarithm problem on an elliptic curve E over GF(q) as a basis for security and recorded on a record medium, an inverse I of an element y in GF(q) to decrypt the encrypted digital content recorded on the record medium, where GF(q) is an extension field of the finite field GF(p), $q=p^n$, and G is a base point of the elliptic curve E, the record medium reproducing apparatus further comprising:

equation generating means for generating the coefficient matrix A and the constant vector b, using the element y and all coefficients of a generator polynomial of GF(q) whose root is $\alpha$, equation solving means for finding solutions $x_k$ (k=0, 1, 2, ..., n−1) of the system of linear equations Ax=b, the equation solving means including the machine readable memory; and inverse computing means for computing the inverse I, $I=x_0+x_1\alpha+ \ldots +x_{n-1}\alpha^{n-1}$, using the root $\alpha$ and the solutions $x_k$ (k=0, 1, 2, ..., n−1) found by the equation solving means; and means for using I to decrypt the encrypted digital content recorded on the record medium.

20. The apparatus of claim 6, wherein the apparatus is a record medium reproducing apparatus for computing, when copyrighted digital content has been encrypted using a discrete logarithm problem on an elliptic curve E over GF(q) as a basis for security and recorded on a record medium, an inverse I of an element y in GF(q) to decrypt the encrypted digital content recorded on the record medium, where GF(q) is an extension field of the finite field GF(p), $q=p^n$, and G is a base point of the elliptic curve E, the record medium reproducing apparatus comprising:

equation generating means for generating the coefficient matrix A and the constant vector b using the element y and all coefficients of a generator polynomial of GF(q) whose root is $\alpha$;

equation solving means for finding solutions $x_k$ (k=0, 1, 2, ..., n−1) of the system of linear equations Ax=b, the equation solving means including the machine readable memory; and inverse computing means for computing the inverse I, $I=x_0+x_1\alpha+ \ldots +x_{n-1}\alpha^{n-1}$, using the root $\alpha$ and the solutions $x_k$ (k=0, 1, 2, ..., n−1) found by the equation solving means; and means for using I to decrypt the encrypted digital content recorded on the record medium.

21. A machine based method for use in one of: secret communications by encryption and decryption; digital signature generation and verification; and data conversion including encoding and decoding of data, the method solving a system of linear equations Ax=b in n unknowns on a finite field GF(p) where p is a prime, n is a positive integer, A is a coefficient matrix consisting of elements of n rows and n columns, x is a vector of unknowns consisting of n elements, and b is a constant vector consisting of n elements, the method comprising:

utilizing a machine readable memory to provide instructions to a machine for execution by the machine, wherein the instructions, when executed by the machine, cause the machine to perform operations comprising:

reading a stored coefficient matrix A and a stored constant vector b, and triangular transforming the read coefficient matrix A and constant vector b to generate a coefficient matrix C and a constant vector d for a system of linear equations Cx=d in n unknowns that is equivalent to the system of linear equations Ax=b, the coefficient matrix C consisting of elements of n rows and n columns and the constant vector d consisting of n elements;

calculating inverses of diagonal elements of the generated coefficient matrix C on the finite field GF(p); and solving the system of linear equations Cx=d using the generated coefficient matrix C, the generated constant vector d, and the calculated inverses of the diagonal elements of the generated coefficient matrix C, to thereby solve the system of linear equations Ax=bi of the read coefficient matrix A and the read constant vector b, and performing one of: secret communication by encryption and decryption; digital signature generation and verification; and data conversion including encoding and decoding of data, by using the solution of the system of linear equations Ax=b; wherein the coefficient matrix A is triangular transformed into the coefficient matrix C of upper triangular form without a division on the finite field GF(p) being performed;

generating the coefficient matrix C and the constant vector d of the system of linear equations Cx=d from the coefficient matrix A and the constant vector b of the system of linear equations Ax=b includes one or more successive transformation processes;

the system of linear equations Ax=b is subjected to the first transformation process and the system of linear equations Cx=d is generated as a result of the last transformation process, in each transformation process, a coefficient matrix and a constant vector of a system of linear equations in n unknowns are transformed into a coefficient matrix and a constant vector of a system of linear equations in n unknowns that is equivalent to the system of linear equations before the transformation in each transformation process, one pivotal equation which is a linear equation in n unknowns serving as a pivot for the transformation and one or more object equations which are linear equations in n unknowns to be transformed are chosen from the system of linear equations in n unknowns that is subjected to the transformation;

each transformation process has a same number of transformation subprocesses as the one or more object equations, each for transforming a separate one of the one or more object equations into an equation equivalent to the object equation; and in each transformation subprocess, (a) each of the coefficients and a constant in the pivotal equation is multiplied by a nonzero coefficient chosen from the object equation, and values generated as a result of the multiplications are set into a second coefficient group, (b) each of coefficients and a constant in the object equation is multiplied by a nonzero coefficient chosen from the pivotal equation, and values generated as a result of the multiplications are set into a first coefficient group, and (c) the values in the second coefficient group are subtracted respectively from the values in the first coefficient group, and differences generated as a result of the subtractions are respectively set as coefficients and a constant in the equation equivalent to the object equation.

22. The method of claim 21, wherein when the diagonal elements of the coefficient matrix C are denoted by $m_i$ (i=1,2, ...,n) and the inverses of the diagonal elements $m_i$ (i=1,2, ...,n) in the finite field GF(p) are denoted by $I_i$ (i=1,2, ...,n), calculating the inverses of the diagonal elements of the coefficient matrix C includes (a) computing values t and $t_i$ where $$t_i = \prod_{k=1}^{n} m_k \text{ (except } m_i\text{) mod } p \ (i = 1, 2, \ldots, n)$$

and $$t = \prod_{k=1}^{n} m_k \text{ mod } p$$

(b) computing value u where $u = 1/t \text{ mod } p$ and
(c) computing values $I_i$ where $I_i = u \times t_i \text{ mod } p \ (i=1,2,\ldots,n)$ to find the inverses $I_i$ (i=1,2, . . . ,n).

23. The method of claim 22,
wherein the computing the values t and $t_i$ includes calculating $$s_1 = m_1 \times m_2 \text{ mod } p$$
$$s_2 = s_1 \times m_3 \text{ mod } p$$
$$s_{n-3} = s_{n-4} \times m_{n-2} \text{ mod } p$$

in the stated order, then calculating $$t_n = s_{n-3} \times m_{n-1} \text{ mod } p$$
$$t_{n-1} = s_{n-3} \times m_n \text{ mod } p$$
$$s_n = m_{n-1} \times m_n \text{ mod } p$$
$$t_{n-2} = s_{n-4} \times s_n \text{ mod } p$$
$$s_{n-1} = m_{n-2} \times s_n \text{ mod } p$$
$$t_{n-3} = s_{n-5} \times s_{n-1} \text{ mod } p$$
$$s_{n-2} = m_{n-3} \times s_{n-1} \text{ mod } p$$
$$t_{n-4} = s_{n-6} \times s_{n-2} \text{ mod } p$$
$$s_5 = m_4 \times s_6 \text{ mod } p$$
$$t_3 = s_1 \times s_5 \text{ mod } p$$
$$s_4 = m_3 \times s_5 \text{ mod } p$$
$$t_2 = m_1 \times s_4 \text{ mod } p$$
$$t_1 = m_2 \times s_4 \text{ mod } p$$

in the stated order, and lastly calculating $t = t_j \times m_j$ for a value j chosen from a set of positive integers $\{1,2, \ldots ,n\}$.

24. A machine based method for use in one of: secret communications by encryption and decryption; digital signature generation and verification; and data conversion including encoding and decoding of data, the method solving a system of linear equations Ax=b in n unknowns on a finite field GF(p) where p is a prime, n is a positive integer, A is a coefficient matrix consisting of elements of n rows and n columns, x is a vector of unknowns consisting of n elements, and b is a constant vector consisting of n elements, the method comprising:

utilizing a machine readable memory to provide instructions to a machine for execution by the machine, wherein the instructions, when executed by the machine, cause the machine to perform operations comprising:

reading a stored coefficient matrix A and a stored constant vector b, and triangular transforming the read coefficient matrix A and constant vector b to generate a coefficient matrix C and a constant vector d for a system of linear equations Cx=d in n unknowns that is equivalent to the system of linear equations Ax=b, the coefficient matrix C consisting of elements of n rows and n columns and the constant vector d consisting of n elements;

calculating inverses of diagonal elements of the generated coefficient matrix C on the finite field GF(p); and solving the system of linear equations Cx=d using the generated coefficient matrix C, the generated constant vector d, and the calculated inverses of the diagonal elements of the generated coefficient matrix C, to thereby solve the system of linear equations Ax=bi of the read coefficient matrix A and the read constant vector b, and performing one of: secret communication by encryption and decryption; digital signature generation and verification; and data conversion including encoding and decoding of data, by using the solution of the system of linear equations Ax=b; wherein the coefficient matrix A is triangular transformed into the coefficient matrix C of upper triangular form without a division on the finite field GF(p) being performed;

generating the coefficient matrix C and the constant vector d of the system of linear equations Cx=d from the coefficient matrix A and the constant vector b of the system of linear equations Ax=b includes one or more successive transformation processes;

the system of linear equations Ax=b is subjected to the first transformation process and the system of linear equations Cx=d is generated as a result of the last transformation process;

in each transformation process, a coefficient matrix and a constant vector of a system of linear equations in n unknowns are transformed into a coefficient matrix and a constant vector of a system of linear equations in n unknowns that is equivalent to the system of linear equations before the transformation;

in each transformation process, one pivotal equation which is a linear equation in n unknowns serving as a pivot for the transformation and one or more object equations which are linear equations in n unknowns to be transformed are chosen from the system of linear equations in n unknowns that is subjected to the transformation;

each transformation process has a coefficient group calculation process and a same number of transformation subprocesses as the one or more object equations, the transformation subprocesses being performed following the coefficient group calculation process and being each for transforming a separate one of the one or more object equations;

in the coefficient group calculation process,
(a) a nonzero coefficient is chosen from each of the pivotal equation and the one or more object equations, a product is calculated for each of the pivotal equation and the one or more object equations by multiplying together all chosen nonzero coefficients except a nonzero coefficient chosen from the equation, and products calculated respectively for the pivotal equation and the one or more object equations are set into a first coefficient group, and (b) each of coefficients and a constant in the pivotal equation except a nonzero coefficient chosen from the pivotal equation in the coefficient group calculation process is multiplied by a product in the first coefficient group calculated for the pivotal equations, and values generated as a result of the multiplications are set into a second coefficient group; and in each transformation subprocess for transforming a separate one of the one or more object equations, (a) a nonzero coefficient chosen from the object equation in the coefficient group calculation process is changed to 0 as a new coefficient, (b) each of coefficients in the object equation except the nonzero coefficient chosen from the object equation is multiplied by a product in the first coefficient group calculated for the object equations, values in the second coefficient group calculated from the coefficients in the pivotal equations are subtracted respectively from values generated as a result of the multiplications on the coefficients in the object equation to generate differences, and the coefficients in the object equation are changed respectively to the differences as new coefficients, and (c) a constant in the object equation is multiplied by the product calculated for the object equations, a value in the second coefficient group calculated from the constant in the pivotal equation is subtracted from a value generated as a result of the multiplication on the constant in the object equation to generate a difference, and the constant in the object equation is changed to the difference as a new constant.

25. The method of claim 21, wherein
when the diagonal elements of the coefficient matrix C are denoted by $m_i$ (i=1,2, ... ,n) and the inverses of the diagonal elements $m_i$ (i=1,2, ... ,n) in the finite field GF(p) are denoted by $I_i$ (i=J, 2, ..., n), calculating the inverses of the diagonal elements of the coefficient matrix C includes (a) computing values t and $t_i$ where $$t_i = \prod_{k=1}^{n} m_k \text{ (except } m_i\text{) mod } p \quad (i = 1, 2, ..., n)$$

and $$t = \prod_{k=1}^{n} m_k \text{ mod } p$$

(b) computing a value u where $u=1/t \text{ mod } p$ and (c) computing values $I_i$ where $I_i = u \times t_i \text{ mod } p$ (i=1,2, ... ,n)

to find the inverses $I_i$ (i=1,2, ... ,n).

26. The method of claim 25,
wherein computing values t and $t_i$ involves calculating $$s_1 = m_1 \times m_2 \text{ mod } p$$

$$s_2 = s_1 \times m_3 \text{ mod } p$$

$$s_{n-3} = s_{n-4} \times m_{n-2} \text{ mod } p$$

in the stated order, then calculating $$t_n = s_{n-3} \times m_{n-1} \text{ mod } p$$

$$t_{n-1} = s_{n-3} \times m_n \text{ mod } p$$

$$s_n = m_{n-1} \times m_n \text{ mod } p$$

$$t_{n-2} = s_{n-4} \times s_n \text{ mod } p$$

$$s_{n-1} = m_{n-2} \times s_n \text{ mod } p$$

$$t_{n-3} = s_{n-5} \times s_{n-1} \text{ mod } p$$

$$s_{n-2} = m_{n-3} \times s_{n-1} \text{ mod } p$$

$$t_{n-4} = s_{n-6} \times s_{n-2} \text{ mod } p$$

$$s_5 = m_4 \times s_6 \text{ mod } p$$

$$t_3 = s_1 \times s_5 \text{ mod } p$$

$$s_4 = m_3 \times s_5 \text{ mod } p$$

$$t_2 = m_1 \times s_4 \text{ mod } p$$

$$t_1 = m_2 \times s_4 \text{ mod } p$$

in the stated order, and lastly calculating $t = t_j \times m_j$ for a value j chosen from a set of positive integers {1,2, ... ,n}.

* * * * *

UNITED STATES PATENT AND TRADEMARK OFFICE
CERTIFICATE OF CORRECTION

| | |
|---|---|
| PATENT NO. | : 7,092,522 B1 |
| APPLICATION NO. | : 09/603636 |
| DATED | : August 15, 2006 |
| INVENTOR(S) | : Futa |

It is certified that error appears in the above-identified patent and that said Letters Patent is hereby corrected as shown below:

In the Claims:
In Claim 2, Column 32, line 31, "(i=1, 2, ...n)" should have a comma inserted before "n".
In Claim 2, Column 32, line 64, insert --[[ : ]]--.
In Claim 2, Column 22, line 15, insert --[[ : ]]--.
In Claim 6, Column 35, line 40, insert --[[ : ]]--.
In Claim 6, Column 35, line 58, insert --[[ : ]]--.
In Claim 7, Column 36, line 14, the "," should be --;--.
In Claim 7, Column 36, line 41, "(y)" should be --(p)--.
In Claim 8, Column 36, line 59, the "," should be --;--.
In Claim 9, Column 37, line 8, after "where" insert --q=pn--.
In Claim 10, Column 37, line 27, after "3" insert --,--.
In Claim 10, Column 37, line 29, after "where" delete "p,".
In Claim 10, Column 37, line 35, delete "," and insert --;--.
In Claim 11, Column 37, line 57, delete "," and insert --;--.
In Claim 11, Column 37, line 59, "(i=1, 2, ...n)" should have a comma inserted before "n".
In Claim 12, Column 38, line 9, delete the "," after "b".
In Claim 13, Column 38, line 27, "p=pn" should be --q=pn,--.
In Claim 14, Column 38, line 61, after "Ax=b" insert --, the equation solving means including--.
In Claim 14, Column 39, line 7, after "machine" insert --,--.
In Claim 15, Column 39, line 44, delete the "," after "b".
In Claim 16, Column 40, line 4, "A," should be --d;--.
In Claim 19, Column 41, line 9, the "," should be --;--.
In Claim 23, Column 43, line 30, insert --[[ : ]]--.
In Claim 23, Column 43, line 48, insert --[[ : ]]--.
In Claim 26, Column 46, line 23, insert --[[ : ]]--.

UNITED STATES PATENT AND TRADEMARK OFFICE
CERTIFICATE OF CORRECTION

| | |
|---|---|
| PATENT NO. | : 7,092,522 B1 |
| APPLICATION NO. | : 09/603636 |
| DATED | : August 15, 2006 |
| INVENTOR(S) | : Futa |

It is certified that error appears in the above-identified patent and that said Letters Patent is hereby corrected as shown below:

In Claim 26, Column 46, line 39, insert --[[ : ]]--.

Signed and Sealed this

Twenty-first Day of August, 2007

JON W. DUDAS
*Director of the United States Patent and Trademark Office*